United States Patent
Jones

(10) Patent No.: US 7,813,564 B2
(45) Date of Patent: Oct. 12, 2010

(54) METHOD FOR CONTROLLING THE AMOUNT OF COMPRESSED DATA

(75) Inventor: Paul W. Jones, Churchville, NY (US)

(73) Assignee: Eastman Kodak Company, Rochester, NY (US)

(*) Notice: Subject to any disclaimer, the term of this patent is extended or adjusted under 35 U.S.C. 154(b) by 752 days.

(21) Appl. No.: 11/693,958

(22) Filed: Mar. 30, 2007

(65) Prior Publication Data
US 2008/0240583 A1  Oct. 2, 2008

(51) Int. Cl.
G06K 9/36 (2006.01)
G06K 9/46 (2006.01)
G06K 9/68 (2006.01)

(52) U.S. Cl. ........................ 382/232; 382/240

(58) Field of Classification Search ............... 382/172, 382/173, 218–220, 232, 233, 239, 240, 248, 382/251, 272; 375/240.02, 240.03, 240.1, 375/240.19, 240.23, E7.035, E7.051, E7.059; 348/390, 391, 405, 408, 419, 420, 437, 438, 348/439.1, 568

See application file for complete search history.

(56) References Cited

U.S. PATENT DOCUMENTS

| | | | |
|---|---|---|---|
| 4,785,349 A * | 11/1988 | Keith et al. | 375/240.23 |
| 4,868,653 A * | 9/1989 | Golin et al. | 375/240.23 |
| 5,241,395 A * | 8/1993 | Chen | 358/426.14 |
| 5,448,296 A * | 9/1995 | Music | 375/240.01 |
| 6,356,668 B1 | 3/2002 | Honsinger et al. | |
| 6,434,168 B1 * | 8/2002 | Kari | 370/521 |
| 6,614,942 B1 | 9/2003 | Meier | |
| 6,650,782 B1 | 11/2003 | Joshi et al. | |
| 6,731,814 B2 * | 5/2004 | Zeck et al. | 382/239 |

(Continued)

FOREIGN PATENT DOCUMENTS

| | | |
|---|---|---|
| GB | 2 401 739 | 11/2004 |
| WO | 2008/030434 | 3/2008 |

OTHER PUBLICATIONS

Chandler et al.: "Contrast-based quantization and rate control for wavelet-coded images" Proceedings 2002 International Conference on Image Processing. vol. 3, Sep. 22, 2002, pp. 233-236.

(Continued)

Primary Examiner—Amir Alavi
(74) Attorney, Agent, or Firm—Stephen H. Shaw

(57) ABSTRACT

A method is disclosed for compressing a set of digital images to achieve an average compressed data rate over the entire set. A subset of images are selected from the set of images. A threshold viewing distance and a desired average compressed data rate are specified, and compression parameters are determined from the threshold viewing distance. The subset of images is compressed with the compression parameters to produce compressed data, and an average compressed data rate is calculated for the compressed data from the subset of images. The average compressed data rate for the subset of images is compared to the desired average data rate. If the average compressed data rate for the subset of images is less than or equal to the desired average compressed data rate, remaining images from the image sequence that are not in the subset of images are compressed using the compression parameters that were used for the subset of images. Otherwise, the threshold viewing distance is modified to a larger distance and the compression process is repeated.

17 Claims, 19 Drawing Sheets

U.S. PATENT DOCUMENTS

| | | | |
|---|---|---|---|
| 7,251,372 B2 * | 7/2007 | Wood | 382/239 |
| 7,646,925 B2 * | 1/2010 | Kato et al. | 382/232 |
| 2001/0014120 A1 | 8/2001 | Saunders et al. | |
| 2004/0008767 A1 * | 1/2004 | Ueda et al. | 375/240.01 |
| 2004/0156551 A1 * | 8/2004 | Nishiyama | 382/239 |
| 2005/0100229 A1 | 5/2005 | Becker et al. | |
| 2008/0240583 A1 * | 10/2008 | Jones | 382/232 |

OTHER PUBLICATIONS

Zeng et al.: "An overview of the visual optimization tools in JPEG 2000", Signal Processing. Image Communication, Elsevier Science Publishers, Amsterdam, NL. vol. 17, No. 1, Jan. 1, 2002, pp. 85-104.

Jones: "Efficient JPEG 2000 VBR compression with true constant perceived quality", SMPTE Journal, SMPTE Inc. Scarsdale, NY, US, vol. 116, No. 7/08, Jul. 1, 2007, pp. 257-265.

Smith et al.: "JPEG-2000 Rate Control for Digital Cinema", SMPTE Motion Imaging Journal, Oct. 2006, pp. 394-399.

"An Overview of the JPEG2000 Still Image Compression Standard", Signal Processing: Image Communication, vol. 17, pp. 3-48, 2002.

"JPEG2000 Image Compression Fundamentals, Standards, and Practice," by Taubman & Marcellin, pp. 339-348, Kluwer Academic Publishing, Boston MA, 2002.

* cited by examiner

US 7,813,564 B2

METHOD FOR CONTROLLING THE AMOUNT OF COMPRESSED DATA

FIELD OF THE INVENTION

The invention relates generally to the field of digital image processing, and in particular to a method for efficiently controlling the compressed data rate in JPEG2000 image compression.

BACKGROUND OF THE INVENTION

JPEG2000 is a sophisticated image compression technique that offers a rich set of features to meet the needs of different applications. These features can be achieved because of the properties of the various components that form a JPEG2000 compression system. A brief description of these components is provided in the following, and a more complete description can be found in the paper by M. Rabbani and R. Joshi entitled "An overview of the JPEG 2000 still image compression standard," Signal Processing: Image Communication, Vol. 17, pp. 3-48, 2002.

FIG. 1 illustrates the basic components in a JPEG2000 compression system. The original image data is sent to a pre-processor 10, where several modifications to the original image data may take place. One possible modification is a color transformation known as the irreversible color transform (ICT). This transform is designed to convert red-green-blue (RGB) image data into a luminance (Y) and two chrominance (Cb, Cr) components for improved compression performance. The pre-processed data is then transformed using a discrete wavelet transform 12, which converts the spatial image data into wavelet coefficients that correspond to a plurality of spatial frequency subbands. The wavelet coefficients are quantized with a uniform quantizer 14 with a deadzone. Quantization is a many-to-one mapping that reduces the amount of data that is used to represent the wavelet coefficients, at the expense of errors in the image that is reconstructed from the quantized wavelet coefficients. The degree of quantization for each frequency subband b is determined by a quantizer step size (denoted as Q(b) in FIG. 1) that is associated with the subband. It is common in JPEG2000 systems to specify a single base step size for quantization, and then derive a set of quantizer step sizes that correspond to the various frequency subbands by using properties of the wavelet transform (i.e., from the band gain factors for each of the frequency subbands). Alternatively, it is possible to specify an explicit set of quantizer step sizes for the frequency subbands for more precise control of the quantization.

The quantized wavelet coefficients are then partitioned into small codeblocks, and the quantized coefficients from each codeblock are encoded as bitplanes using an adaptive binary arithmetic encoder 16. This step is referred to as Tier-1 coding. Finally, the compressed codestream is produced by arranging the encoded codeblock data in various ways using a bitstream organizer 18. This step is referred to as Tier-2 coding. In Tier-2 coding, it is possible to discard encoded data corresponding to one or more bitplanes of the quantized wavelet coefficients, which will reduce the amount of compressed data at the cost of increased error in the decompressed image. The discarding of a bitplane from a given wavelet coefficient is equivalent to coarser quantization of that coefficient. If the quantizer step size that is initially applied to a coefficient is denoted as $\Delta$, the effective quantizer step size after discarding k of the least significant bit planes is $2^k \cdot \Delta$. This relationship between the discarding of coefficient bit planes and the resulting degree of quantization is described by Joshi et al. in U.S. Pat. No. 6,650,782.

The flexibility that is achieved in JPEG2000 comes at the price of high computational complexity, and it is desirable to reduce this complexity while still providing a desired level of image quality. This high computational complexity is particularly a problem in motion imaging applications, where there can be a large number of frames in a sequence that must be encoded with high throughput for the encoding system so as to be economical in time and computing resources. A significant part of the computational load in a JPEG2000 encoder occurs during the Tier-1 coding, in which quantized wavelet coefficients are encoded using an arithmetic coder to form compressed data. After Tier-1 coding, it is common to discard a significant amount of the compressed data during Tier-2 coding to achieve a pre-specified size for the compressed codestream, or to achieve a pre-specified level of distortion in the image that is reconstructed during decompression. This process of varying the amount of compressed data is known as rate control.

One common rate control method for JPEG2000 is post-compression rate-distortion optimization (PCRD-opt). Some variation of PCRD-opt is found in most JPEG2000 software and hardware encoders, and a complete description can be found in the book entitled *JPEG2000 Image Compression Fundamentals, Standards and Practice*, D. S. Taubman and M. W. Marcellin, pp. 339-348, Kluwer Academic Publishers, Boston, Mass., 2002. A typical goal in applying PCRD-opt is to achieve a fixed size for the compressed codestream regardless of the image content. Compression systems that produce a fixed or constant compressed size are known as constant bit rate (CBR). In a typical JPEG2000 implementation using PCRD-opt, the wavelet coefficients are finely quantized, which produces a large amount of compressed data during Tier-1 coding. A PCRD-opt algorithm determines which data should be discarded to meet the pre-specified size by analyzing the impact of discarding the data on the compressed codestream size and the resulting distortion that is incurred in the decompressed image. The goal is to minimize the overall distortion subject to achieving the desired final size of the compressed data. The advantage of using finely quantized wavelet coefficients with a PCRD-opt algorithm is that is possible to precisely control the amount of compressed data so that the codestream size is as close as possible to the pre-specified limit without exceeding the limit. However, this approach is also time-consuming because the formation of the compressed data from the finely quantized coefficients in Tier-1 coding requires significant computations, yet much of the compressed data is discarded in the subsequent rate control process. This is the problem of overcoding. Note also that the evaluation of the excess compressed data also increases the processing time during Tier-2 coding.

Although a PCRD-opt algorithm is typically used to minimize the overall distortion subject to a constraint on the maximum compressed codestream size, it is also possible to use variations of a PCRD-opt algorithm to minimize the compressed codestream size subject to a constraint on the overall distortion. Such a system would produce an approximately constant distortion and the compressed codestream size would fluctuate with the image content. Compression systems that attempt to produce constant quality by allowing the compressed size to vary with the image content are known as variable bit rate (VBR). VBR systems are generally preferred over CBR systems because VBR systems typically produce a smaller average compressed size than CBR for comparable image quality over an ensemble of images that vary in content. However, from a computational point of view, VBR systems still suffer from the problem of overcoding if the transform coefficients are finely quantized prior to the arithmetic coder in Tier-1 Coding.

One method for minimizing the amount of overcoding in motion image sequences is taught by Becker et al. (US Application 2005/0100229). However, this method requires accurate estimation of certain parameters and requires additional logic as a replacement for, or as an extension of, PCRD-optimization. Most JPEG2000 encoders would need modifications to practice the method taught by Becker et al., and the method is also not appropriate for compressing individual image frames. More importantly, this method may fail when image content changes rapidly, such as occurs at scene boundaries in motion sequences.

Another limitation in current systems, whether the system is CBR or VBR, is the distortion metric that is commonly used to quantify image quality is mean-squared error (MSE). MSE is a measure of the numerical difference between pixel values of the original image and the pixel values of the decompressed image. A related metric to MSE is peak signal-to-noise ratio (PSNR), which is specified using deciBell (dB) units. These metrics are mathematically convenient, but it is well known that they do not always correlate with perceived quality. As a result, even if a specific MSE or PSNR is obtained, there is no assurance of a given level of perceived image quality. For many applications, the goal may be visually lossless quality, i.e., the decompressed image appears to be identical to the original image when both are viewed by a human observer under specified viewing conditions. Knowledge of the MSE or PSNR for a compressed image does not provide any information about the viewing conditions under which visually lossless quality will be obtained.

For example, given a compressed image with a PSNR of 40 dB, it is impossible to know a priori what viewing conditions will yield visually lossless quality for the image. It may be that the perceived quality is not visually lossless under specified viewing conditions, or it may be that visually lossless quality is obtained but more compressed data was used than was necessary to achieve that quality. The first scenario results in lower perceived image quality than desired, while the second scenario results in a larger compressed codestream than is necessary for visually lossless quality. Thus, it is not sufficient to rely strictly upon MSE or PSNR as a quality metric. This is particularly the case for VBR systems where one wants to produce a known level of perceived image quality while also compressing the image to the minimum amount of data that is needed for the desired quality.

Another issue that arises in some JPEG2000 applications is the need to satisfy a maximum compressed codestream size for each image. One such application is in Digital Cinema (DCinema) compression. The Digital Cinema Initiative (DCI), a consortium of the major US studios, has recently developed a set of specifications to ensure a certain level of interoperability among DCinema equipment manufacturers. One specification calls for a constraint on the maximum compressed codestream size for each image, with additional restrictions on the maximum amount of compressed data that can be used to represent each color component in an image. The constraint on the maximum compressed codestream size is 1,302,083 bytes per frame for each image frame in an image sequence having 24 frames per second. This constraint on the maximum codestream size can be equivalently specified as an instantaneous maximum compressed data rate of 250 Megabits/sec (Mbps). The amount of compressed data for each color component in an image frame can be a maximum of 1,041,066 bytes, which is equivalent to an instantaneous compressed data rate of 200 Mbps for an image sequence having 24 frames per second. These specifications are driven mainly by the capabilities of current JPEG2000 decompression systems. While CBR systems could always meet these data constraints through a rate control algorithm such as PCRD-opt, it is not a preferred solution because of the typically larger average codestream sizes for CBR as compared to VBR systems. Thus, it is desirable to have a VBR system that provides constant perceived quality to the greatest extent possible while still meeting any constraints on the maximum amount of compressed data for each image.

Beyond these instantaneous rate constraints for each image frame or frame component in an image sequence, it may also be desirable to constrain the total size of the compressed codestream for the entire sequence. In this way, one can be assured that a movie of a given duration will fit onto a storage media with a certain capacity, e.g., a two-hour movie compressed onto a 160 gigabyte (Gbyte) hard drive. The total size of the compressed codestream is also important if compressed movie content is to be transmitted over a communications network instead of being stored on a physical media for transport from a content provider to movie theaters. A smaller total size for the compressed codestream means that the data can be sent more quickly and more cost efficiently to the theaters. Regardless of whether a physical storage media or a communications network is used, the preferred compression solution is VBR encoding because it will produce higher overall image quality than CBR encoding for the same total codestream size.

A constraint on the total size of the compressed codestream is equivalent to a constraint on the average data rate over the entire sequence, and the following discussion will use average data rate, instead of total filesize, for convenience. For example, if one has a movie that is 2 hours in length and wishes to fit the compressed movie onto a 160 Gbyte hard drive, the average compressed data rate must be less than 182 Mbps. Because of the variable bit rate encoding, some frames will use a higher instantaneous compressed data rate (up to the maximum of 250 Mbps in the case of DCI-compliant codestreams), while other frames will use an instantaneous data rate that is substantially less than 182 Mbps. Despite the variation in instantaneous compressed data rate, the goal is to have constant image quality for each frame.

To achieve a desired average data rate with a VBR system while maintaining constant image quality, it is necessary to perform some type of multi-pass encoding. This is because the complexity of the image content is not known a priori, and hence the compressed data rate for a given set of compression parameters is also not known a priori. Workflow efficiency would be greatly reduced if it were necessary to compress the entire content repeatedly with different compression parameters until the desired average data rate was achieved, so a more efficient approach is required. One could make use of a PCRD-opt algorithm to trim the compressed frames, but this is also time consuming in that one must first gather rate-distortion statistics for all frames in a sequence, and then determine which data to discard to meet the average rate requirement while also maintaining constant image quality as quantified by MSE or PSNR.

One approach to improving efficiency is to process only a subset of the data in the image sequence using an initial set of compression parameters and then use the resulting average rate as an estimate of the average rate for all frames. If the estimated average rate is more than the desired rate, the compression parameters are modified and the subset of image data is compressed again. Once the constraint on the desired average data rate is met with the subset of the image data, all of the image frames can be compressed with the determined compression parameters. U.S. Pat. No. 6,356,668 by Honsinger et al. (assigned to Kodak) describes a method for efficient rate control with JPEG compression, using sparsely sampled image regions within a single image to estimate the rate for the entire image. In addition, the patent to Honsinger et al. describes the use of threshold viewing distance as a quality metric in determining the JPEG compression parameters, and its use in constricting a rate-distortion (R-D) curve that can be used in adjusting the compression parameters if additional iterations are required to meet the target data rate.

However, this prior art method by Honsinger et al. has limitations when applied to JPEG2000 VBR compression for image sequence compression in Digital Cinema applications. First, the sparse spatial sampling of images is not efficient with JPEG2000 encoding because of the nature of the wavelet transform (as compared to the DCT that is used in JPEG compression). Second, the method by Honsinger may require a significant number of compression iterations to construct an R-D curve and to achieve the desired average data rate. Each compression iteration requires additional computations, which can lead to an inefficient overall compression process.

Thus, there is the need for a JPEG2000 VBR compression system for image sequences that: (1) minimizes the amount of overcoding so that computational complexity is reduced; (2) produces compressed codestreams that meet constraints on the maximum amount of compressed data both for individual frames and frame components, and for the entire compressed codestream in a computationally efficient manner; and (3) produces constant perceived image quality, while minimizing the amount of compressed data to achieve that level of image quality.

SUMMARY OF THE INVENTION

The present invention is directed to overcoming one or more of the problems set forth above. Briefly summarized, according to one embodiment of the present invention, a method is disclosed for compressing a set of digital images to achieve an average compressed data rate over the entire set, comprising the steps of:

a) specifying a threshold viewing distance and a desired average compressed data rate;

b) selecting a subset of images from the set of images;

c) determining compression parameters from the threshold viewing distance;

d) compressing the subset of images with the compression parameters to produce compressed data;

e) calculating an average compressed data rate for the compressed data from the subset of images;

f) comparing the average compressed data rate for subset of images to the desired average compressed data rate;

g) if the average compressed data rate for the subset of images is less than or equal to the desired average compressed data rate, compressing remaining images from the set of images that are not in the subset of images, using the compression parameters that were used for the subset of images;

h) otherwise, modifying the threshold viewing distance and repeating steps c) to h).

ADVANTAGEOUS EFFECT OF THE INVENTION

The present invention has the following advantages:

It is an advantage of the method of the present invention that it minimizes overcoding in JPEG2000 compression so as to achieve improved computational efficiency.

It is a further advantage of the method of the present invention that it can provide a known level of perceived image quality that is quantified by threshold viewing distance.

It is still another advantage of the method of the present invention that constant perceived quality can be obtained with the minimum amount of compressed data that is needed to provide visually lossless image quality for specified viewing conditions.

It is yet another advantage of the method of the present invention that it can efficiently achieve a desired average compressed data rate for a sequence of image frames.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
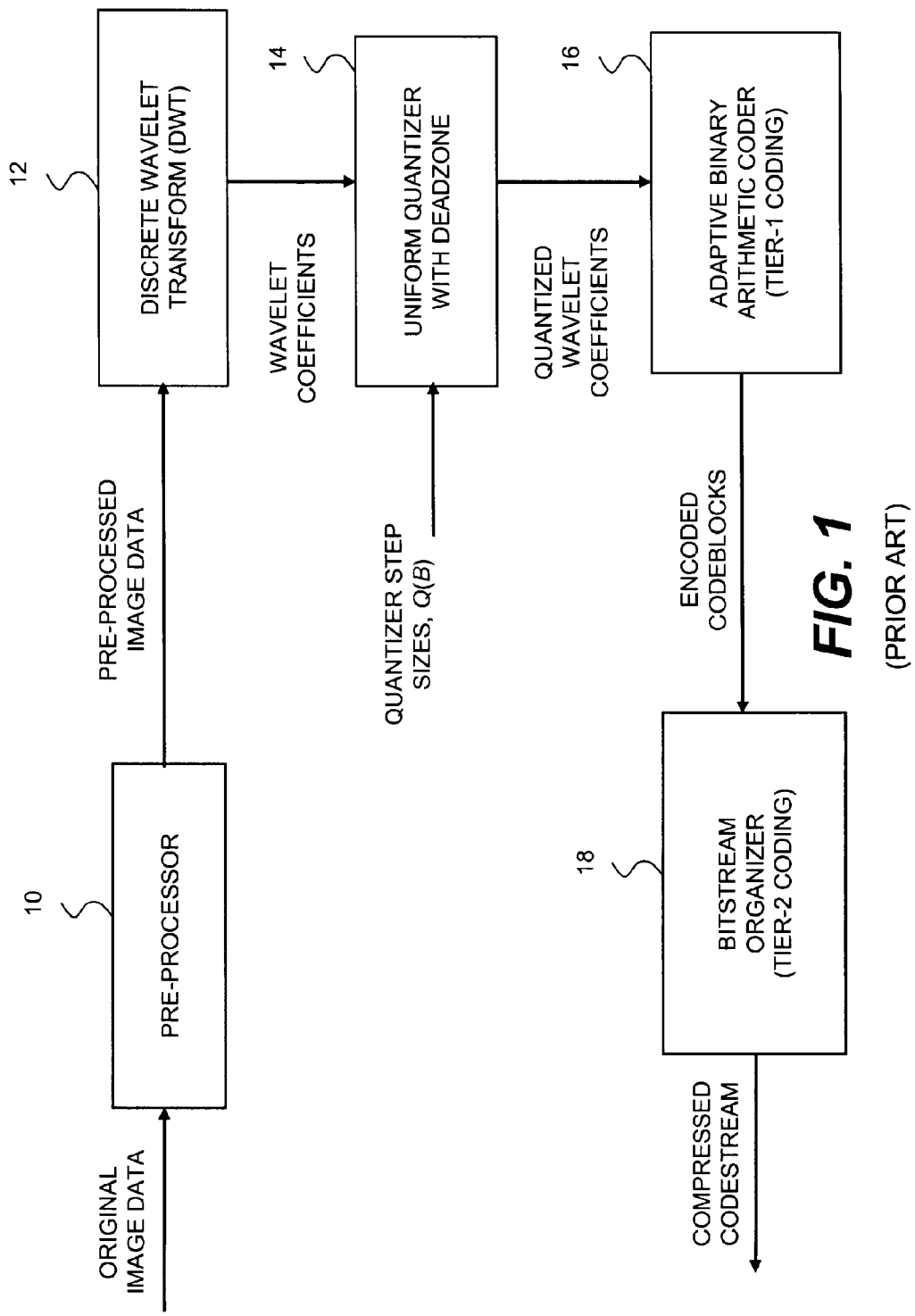
FIG. 1 is a block diagram illustrating the basic components of a prior art JPEG20000 compression system.

The present description is directed in particular to elements forming part of, or cooperating more directly with, apparatus in accordance with the invention. It is to be understood that elements not specifically shown or described may take various forms well known to those skilled in the art.

As discussed previously, the computational complexity of JPEG2000 compression systems can be quite high because of the arithmetic encoding that occurs in Tier-1 coding. In a typical JPEG2000 compression system, the quantizer step sizes are selected so as to produce finely quantized coefficients, which generate a significant amount of data to be encoded. However, during the formation of the compressed codestream in Tier-2 coding, much of the arithmetic-encoded data is subsequently discarded to achieve a desired compressed codestream size. This is the problem of overcoding, where all of the quantized coefficient data is encoded, but not all of it is included in the final codestream.

The present invention addresses the issue of overcoding by generating only a limited amount of quantized coefficient data as input into the arithmetic coder in Tier-1 coding. In this way, there is less data that must be processed by the arithmetic coder, and subsequently, there is also less data that must be evaluated when organizing the final codestream during Tier-2 coding. However, one must be very careful in determining what quantized coefficient data is generated because it is entirely possible to introduce noticeable artifacts in the decompressed image if the quantization is too coarse. To prevent the introduction of artifacts, the present invention uses a model of the human visual system, together with the intended viewing conditions, to determine quantizer step sizes for the wavelet frequency subbands. These quantizer step sizes are optimal in terms of limiting the amount of overcoded data that is generated while still maintaining a desired level of perceived image quality. Viewing conditions include such parameters as the viewing distance (i.e., the distance from the observer to the display), the size and brightness of the display device, etc.

The application of a human visual system model to image compression is well known in the prior art. Daly et al. in U.S. Pat. No. 4,780,761 teach a method of quantizing transform coefficients according to a two-dimensional model of the sensitivity of the human visual system to spatial frequencies. In this method, the transform coefficients are produced by a discrete cosine transform (DCT). The use of a human visual system model for quantizing wavelet coefficients in the context of JPEG2000 has also been described in the prior art, including U.S. Pat. No. 6,650,782 and U.S. Pat. No. 6,668,090, both to Joshi et al. However, none of these prior art methods addresses the problem of overcoding in JPEG2000 or provides an efficient means to meet constraints on the maximum amount of compressed data. Before describing how the present invention solves these problems, it is useful to describe a human visual system model and how it can be applied to image compression.

Figure 2:
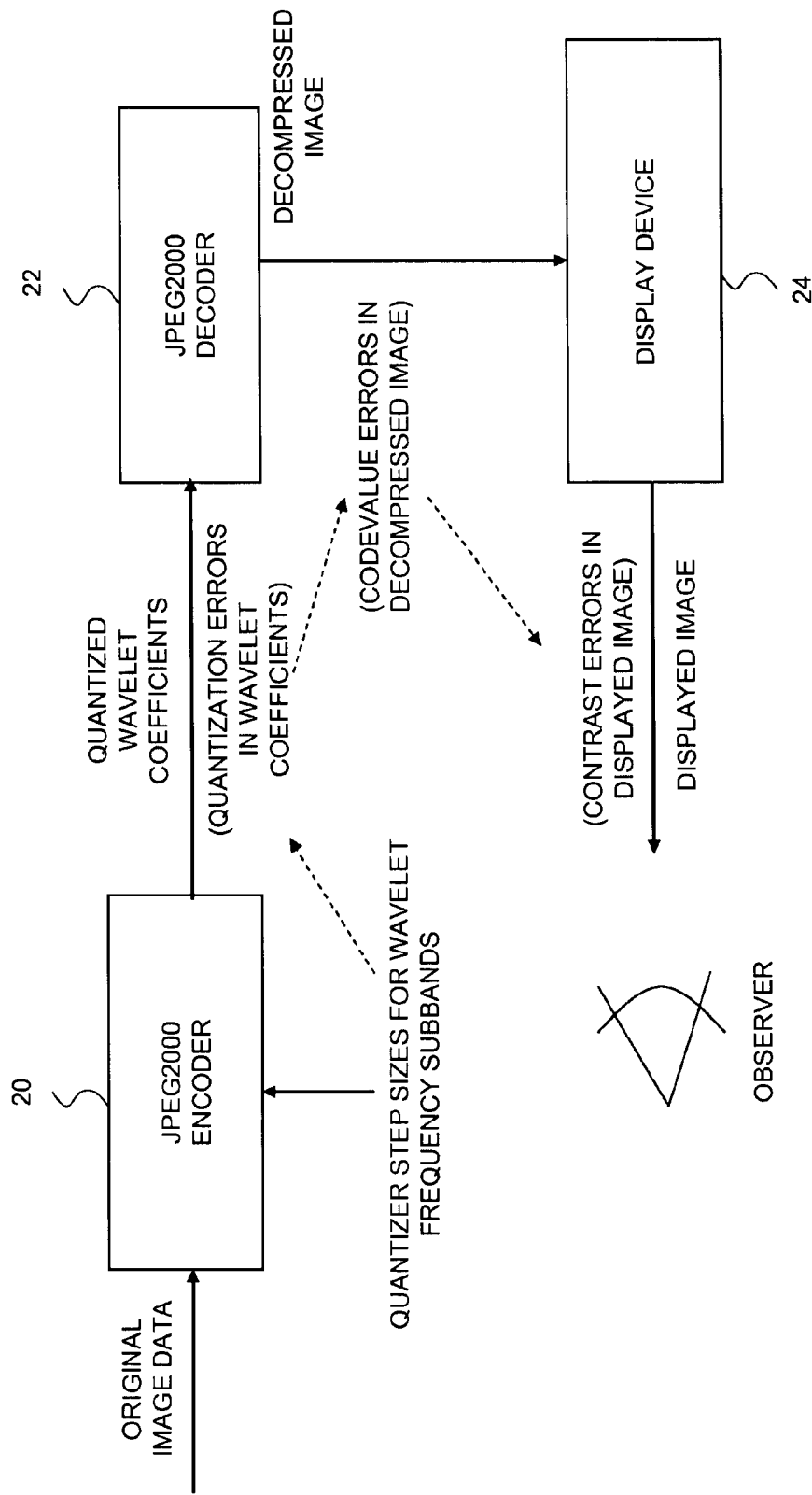
FIG. 2 is a block diagram illustrating the propagation of error from a JPEG2000 encoder to a displayed image.

Referring to FIG. 2, the propagation of error from JPEG2000 compression to the displayed image is illustrated. Original image data is compressed using a JPEG2000 encoder 20 with quantizer step sizes for the various wavelet frequency subbands. Quantization introduces errors in the quantized wavelet coefficients relative to the unquantized wavelet coefficients. The quantized wavelet coefficients are encoded and eventually passed to a JPEG2000 decoder 22, which reconstructs an image from the decoded quantized coefficients. The errors in the quantized coefficients result in errors in the decompressed image codevalues relative to the original image codevalues. When the decompressed image is sent to a display device 24, the displayed image can be viewed by a human observer. The displayed image contains contrast errors because of the errors in the decompressed image codevalues. Contrast has a specific meaning in the field of human psychophysical research, and the term is defined shortly hereafter. Given a combined JPEG2000 encoder/decoder and display system as was just described, the goal is to determine quantizer step sizes that will lead to contrast errors at the display that are not detectable by the human observer.

Contrast is a measure of the brightness variation of a signal relative to its average brightness. Contrast can be defined in various ways depending upon the specific characteristics of the signal that is being viewed. One very common definition is:

$$\text{Contrast} = \frac{L_{max} - L_{min}}{L_{max} + L_{min}} = \frac{\Delta L}{2 \cdot L_{mean}}, \quad (1)$$

where $L_{max}$ is the maximum luminance of the signal, $L_{min}$ is the minimum luminance of the signal, $\Delta L$ is the difference between the minimum and maximum luminances, and $L_{mean}$ is the average luminance. This definition of contrast is known as Michelson contrast, and it is particularly appropriate for signals whose luminance varies sinusoidally. While the artifacts that are produced by wavelet compression techniques are not simple sinusoids, we have found that Michelson contrast works reasonably well in practicing the present invention.

For a sinusoidal stimulus with a spatial frequency f, it is possible to determine, through psychophysical experiments, the minimum contrast that is needed for an observer to detect the presence of the stimulus. This minimum detectable contrast is known as the contrast threshold for that frequency, which we denote as $C_t(f)$. Contrast sensitivity is defined simply as 1/(contrast threshold), which allows one to define a contrast sensitivity function (CSF) as:

$$CSF=1/C_t(f)\forall f>0. \quad (2)$$

Figure 3:
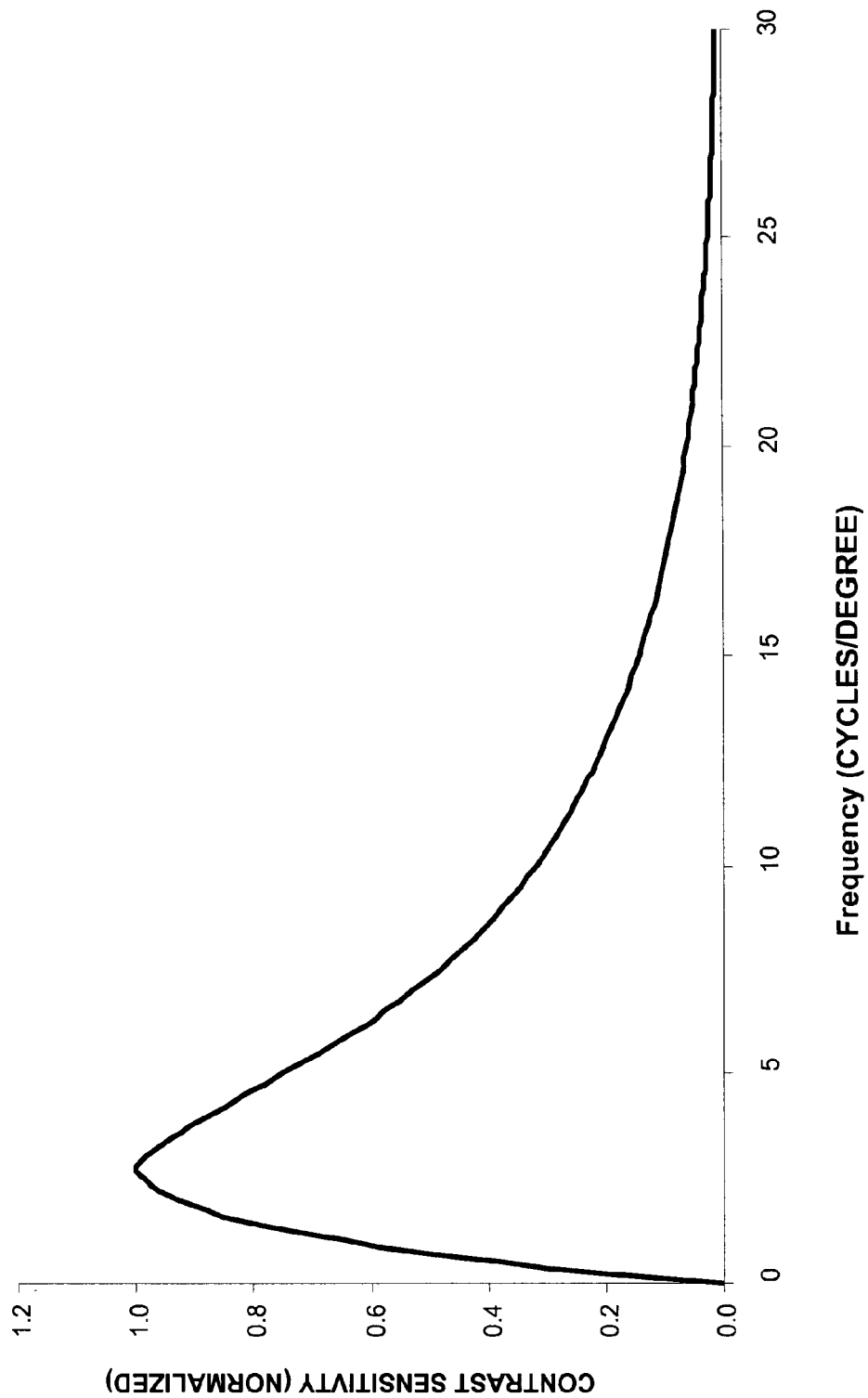
FIG. 3 is an example of a contrast sensitivity function for the human visual system.

FIG. 3 illustrates a typical contrast sensitivity function, where the spatial frequencies are given in units of cycles/degree of visual subtense. The shape of the contrast sensitivity function varies with a number of viewing condition parameters such as the average brightness level, the noise level of the display, orientation, etc., as is well known to those skilled in the art.

Figure 4:
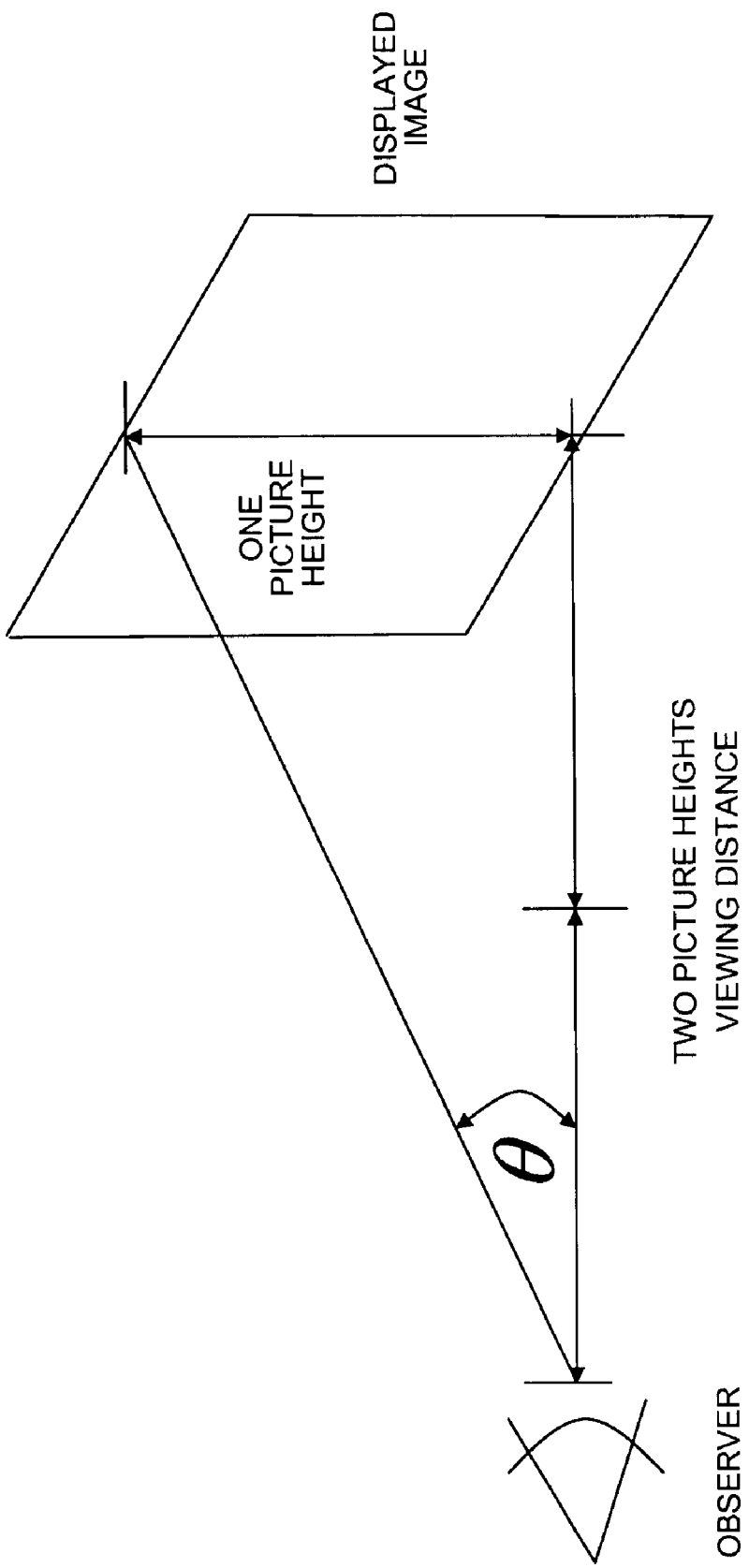
FIG. 4 is an illustration of viewing distance in units of picture heights.

One viewing condition parameter that is especially important when applying the CSF is the viewing distance. Once the intended viewing distance and the display characteristics are specified, it is possible to map the units of cycles/degree for the CSF to physical units on the display, such as cycles/mm as outlined in U.S. Pat. No. 6,349,151 to Jones et al. However, the units of cycles/mm are a function of the specific display, and it was found to be convenient to map the CSF to units of cycles/picture height in embodiments of the present invention. In this way, the measurement units for size of the displayed pixels and the viewing distance are combined, and it is only necessary to specify the viewing distance in terms of the number of picture heights from the display to the observer to establish the proper scaling of the CSF spatial frequency axis. This concept of viewing distance in terms of picture heights is illustrated in FIG. 4 for a viewing distance of two picture heights. The total subtended angle for the displayed image is denoted as θ in FIG. 4. The units of cycles/degree can be converted to cycles/picture height by the following simple computation:

cycles/picture height=(cycles/degree)(θ degrees/picture height) (3)

For example, an image that is viewed at two picture heights will have a total subtended angle of $\theta=\tan^{-1}(1/2)=26.6°$. A similar computation can be done for any desired viewing distance, e.g., the total subtended angle of a display at a viewing distance of one picture height is $\tan^{-1}(1/1)=45°$.

Figure 5:
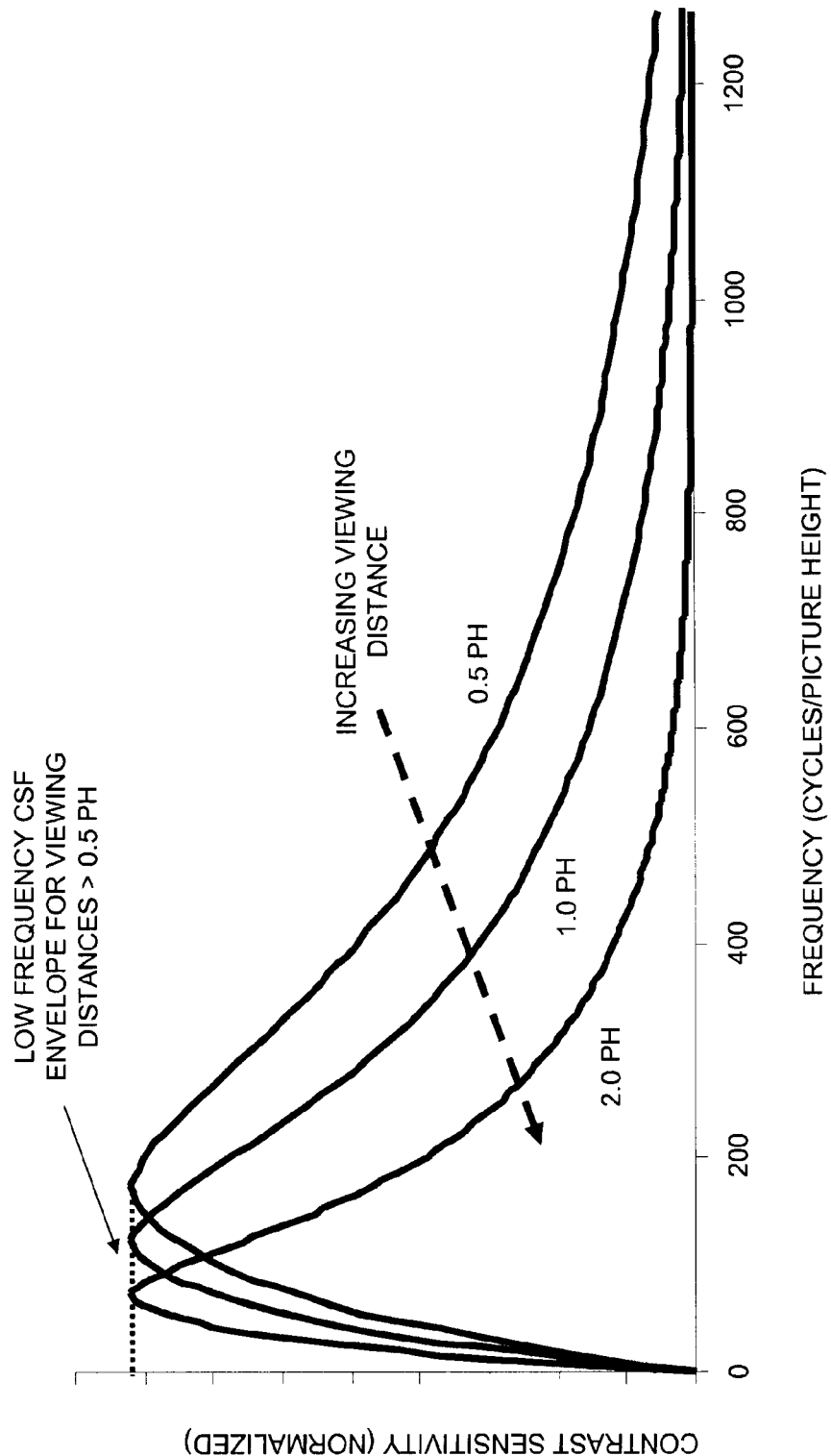
FIG. 5 is an illustration of the effect of viewing distance on a contrast sensitivity function.

The mapping of the CSF to cycles/picture height and the resulting effect of the viewing distance in picture heights is illustrated in FIG. 5 for viewing distances of 0.5, 1.0, and 2.0 picture heights (PH). As an observer moves further from the display, the CSF is mapped to lower spatial frequencies and there is less sensitivity to the higher spatial frequencies. For cinema applications, it is common to use the term screen heights instead of picture heights, where it is assumed that the image is projected so that its height approximately fills a movie screen, so the terms picture height and screen height are essentially equivalent and will be treated as such, herein for the present invention. Alternatively, the viewing distance is sometimes specified in dimensions that relate to the size of displayed pixels. For example, if an image has a height dimension of 1000 pixels, then a two-picture height viewing distance could also be described as 2000 pixels, where a pixel has the same dimensions as a pixel shown on the display. The units of picture heights, screen heights, and display pixels to describe the viewing distance are easily interchangeable, but it can be advantageous to select one over the others depending upon the domain of the viewing application.

Figure 6:
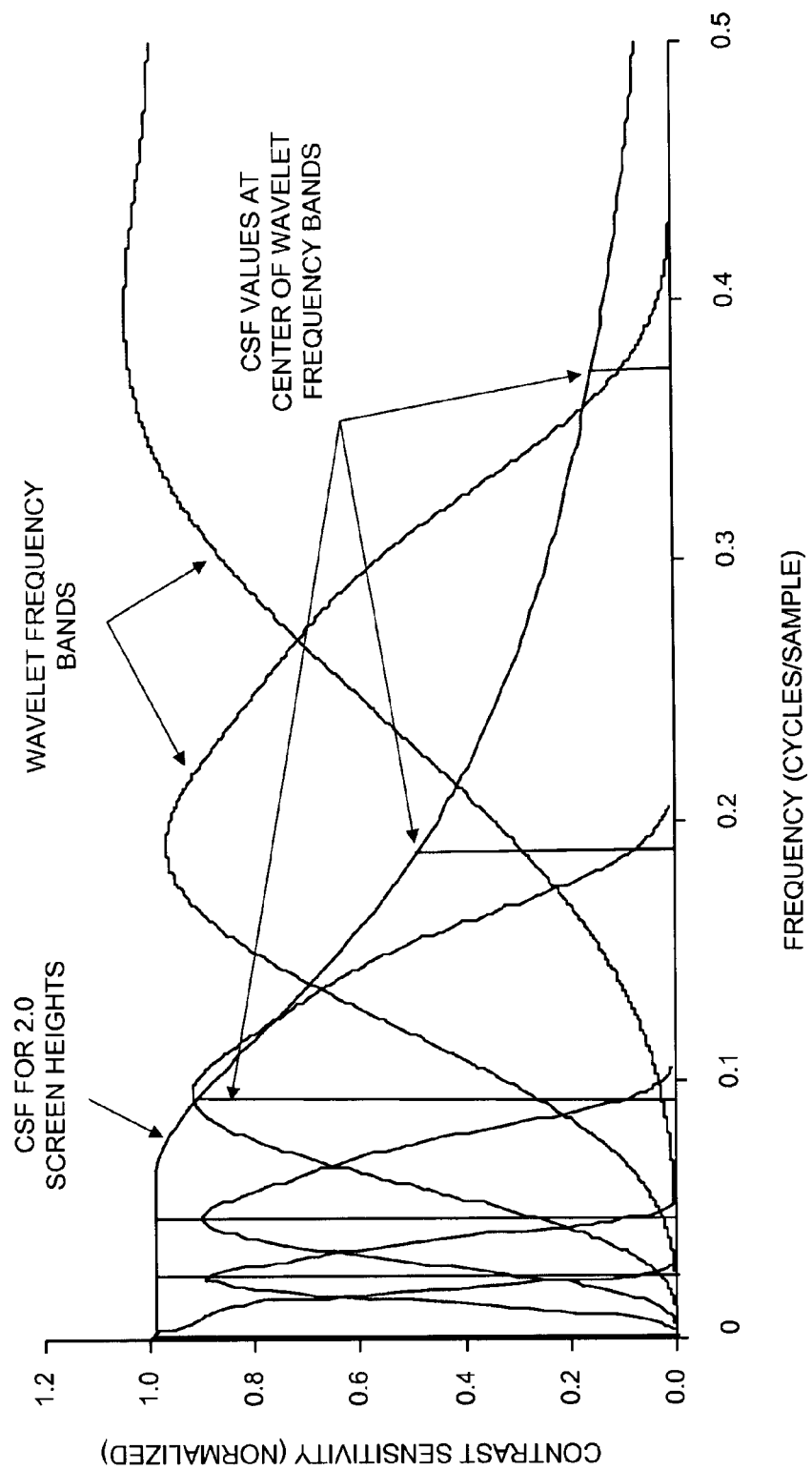
FIG. 6 is an example of mapping the contrast sensitivity function values to individual wavelet subbands.

Given the viewing distance and other viewing condition parameters such as display brightness, an appropriate CSF curve can be computed from a CSF model, such as the one described by Daly et al. in U.S. Pat. No. 4,780,761. Subsequently, one maps the CSF values (essentially a continuous function) to the discrete wavelet subbands. However, each wavelet subband contains a range of spatial frequencies, so one must select a single frequency to represent an entire subband. FIG. 6 illustrates a mapping where the center frequency of each subband is used; the CSF in this example is for a viewing distance of 2.0 screen heights. Other mappings are possible, e.g., using a lower frequency than the center frequency to be more conservative in defining the sensitivity to the errors that arise in each subband.

It is important to note that in applying the CSF to the present invention, the envelope of all CSFs with a viewing distance greater than specified viewing distance is used. An example of a low frequency CSF envelope is illustrated in FIG. 5 for a viewing distance of 0.5 PH. The use of this envelope has the effect of removing the low frequency roll-off of the CSF, so that an image that has been compressed for an intended viewing distance D will still be visually lossless for all viewing distances greater than D. The intended viewing distance D is also referred to as the threshold viewing distance, because any closer viewing distances may reveal contrast errors that are present in the decompressed, displayed image. The quantizer step sizes that are derived using the threshold viewing distance and other associated viewing conditions are referred to as the threshold quantizer step sizes. Threshold viewing distance is a precise way to specify image quality as it provides a meaningful, physical quantity that indicates under what viewing conditions a compressed image will be visually lossless as compared to the original, uncompressed image. This is in contrast to techniques that rely strictly upon MSE or PSNR metrics, which provides little information as to the suitability of an image for specific display conditions.

Once the CSF values that correspond to the wavelet subbands are known, it is then possible to compute the corresponding set of quantizer step sizes that will produce visually lossless quality for the specified viewing conditions. To perform this computation there are two other relationships that must be characterized.

Figure 7:
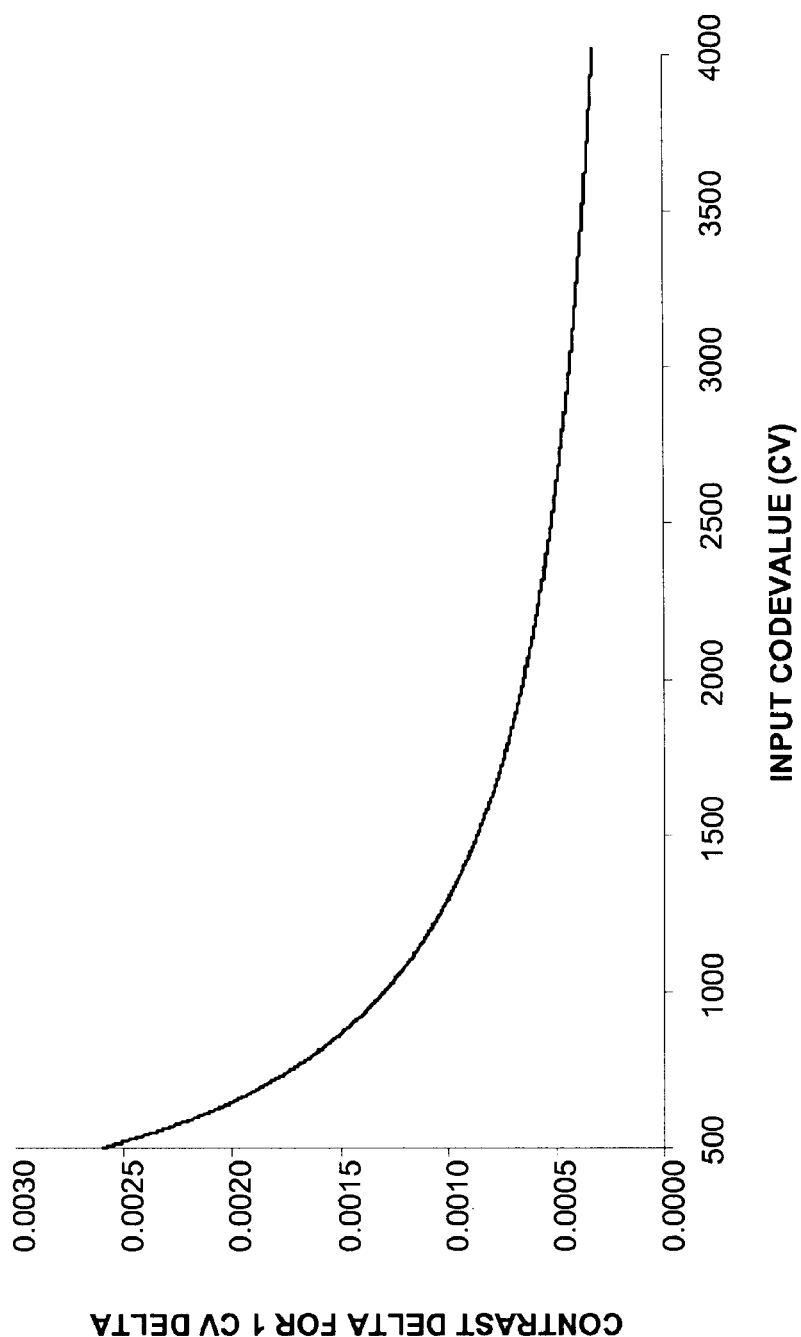
FIG. 7 is an example of the contrast delta that is produced by a delta of one codevalue as input to a display as a function of the input level.

The first is a characterization of the display in terms of the contrast changes in the displayed image that are produced by codevalue changes at the input to the display. Specifically, one needs to know the displayed contrast delta for an input delta of one codevalue (CV). As it turns out, this relationship is a function of the signal level at which the one CV delta occurs, and this is illustrated in FIG. 7 for 12-bit data that is displayed with gamma of 2.6. It can be seen that the maximum contrast change is produced at low CVs (the shadow regions), but an observer is more likely to be adapted to a higher brightness level. Because of this, a mid-scale input level can be selected to establish the contrast/CV relationship.

The second is a characterization of the JPEG2000 encoder/decoder system in terms of the CV changes that are produced in a decompressed image for a given quantizer step size. Specifically, one needs to know the quantizer step size, Q(b), for each wavelet subband b that will produce a one CV delta in the decompressed image. These values can be determined either by direct numerical calculations or through simple experimentation. The specific quantizer step sizes to produce a one CV delta will depend upon the JPEG2000 implementation and also the wavelet filter (e.g., the 9-7 filter in the case of DCI-compliant systems).

Figure 8:
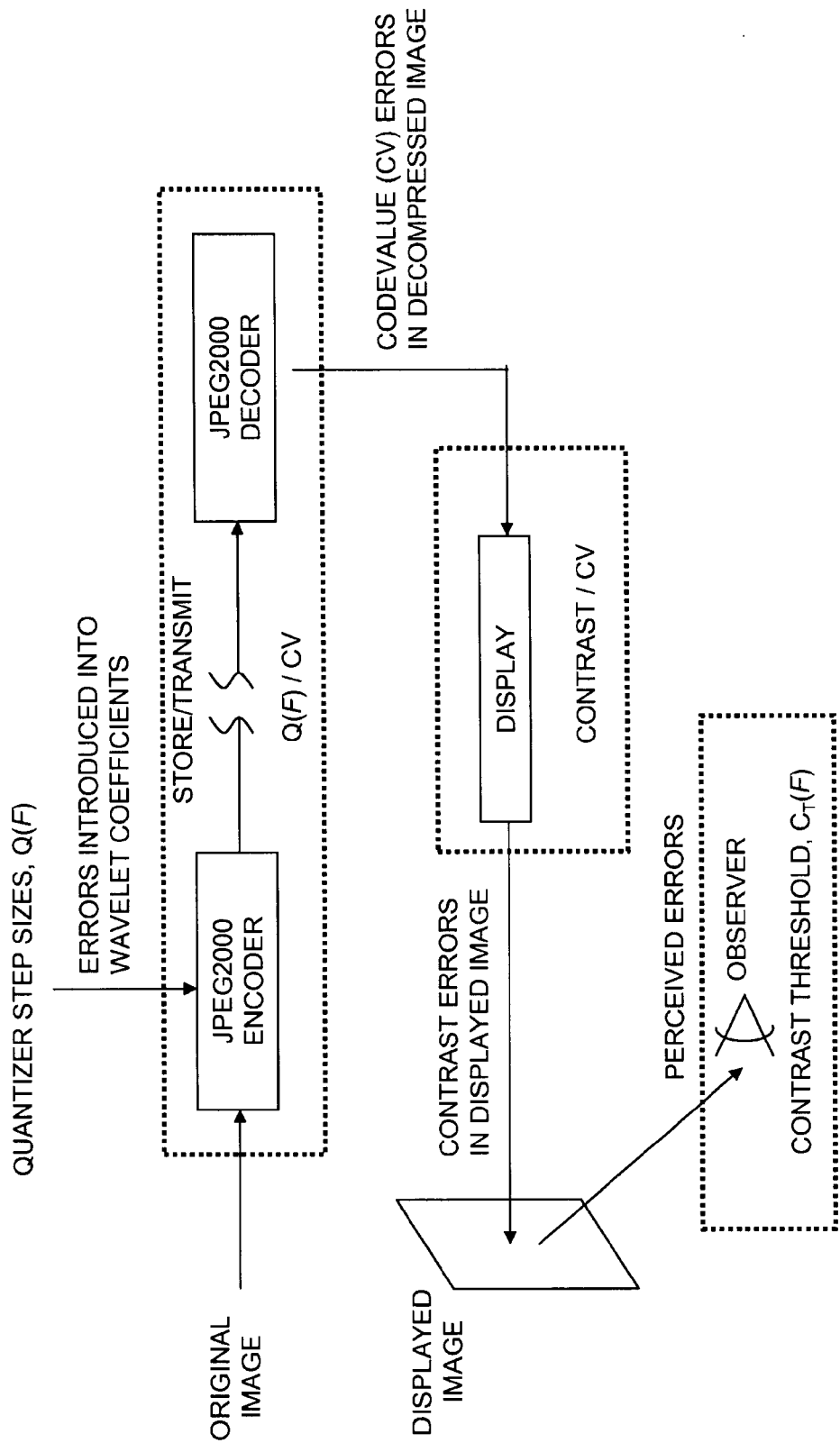
FIG. 8 is an illustration of the observer response and the characterizations of the encoder/decoder system and the display.

After determining these two characterizations, they can be combined with the CSF values to determine the actual threshold quantizer step sizes for visually lossless compression. Referring to FIG. 8, it can be seen that the JPEG2000 encoder/decoder system is characterized by the quantizer step size for each wavelet subband b that leads to a one CV delta (Q(b)/CV) in the decompressed image; the display is characterized by the contrast delta for a one CV input delta (Contrast/CV), and the observer is characterized by the threshold contrast ($C_t(b)$) for each subband b, which can be determined from the CSF by inverting Eq. 2. Given these relationships, the threshold quantizer step size $Q_t(b)$ for a given wavelet subband b is:

$$Q_t(b) = \frac{[Q(b)/CV] \cdot [C_t(b)]}{[Contrast/CV]}. \quad (4)$$

Figure 9:
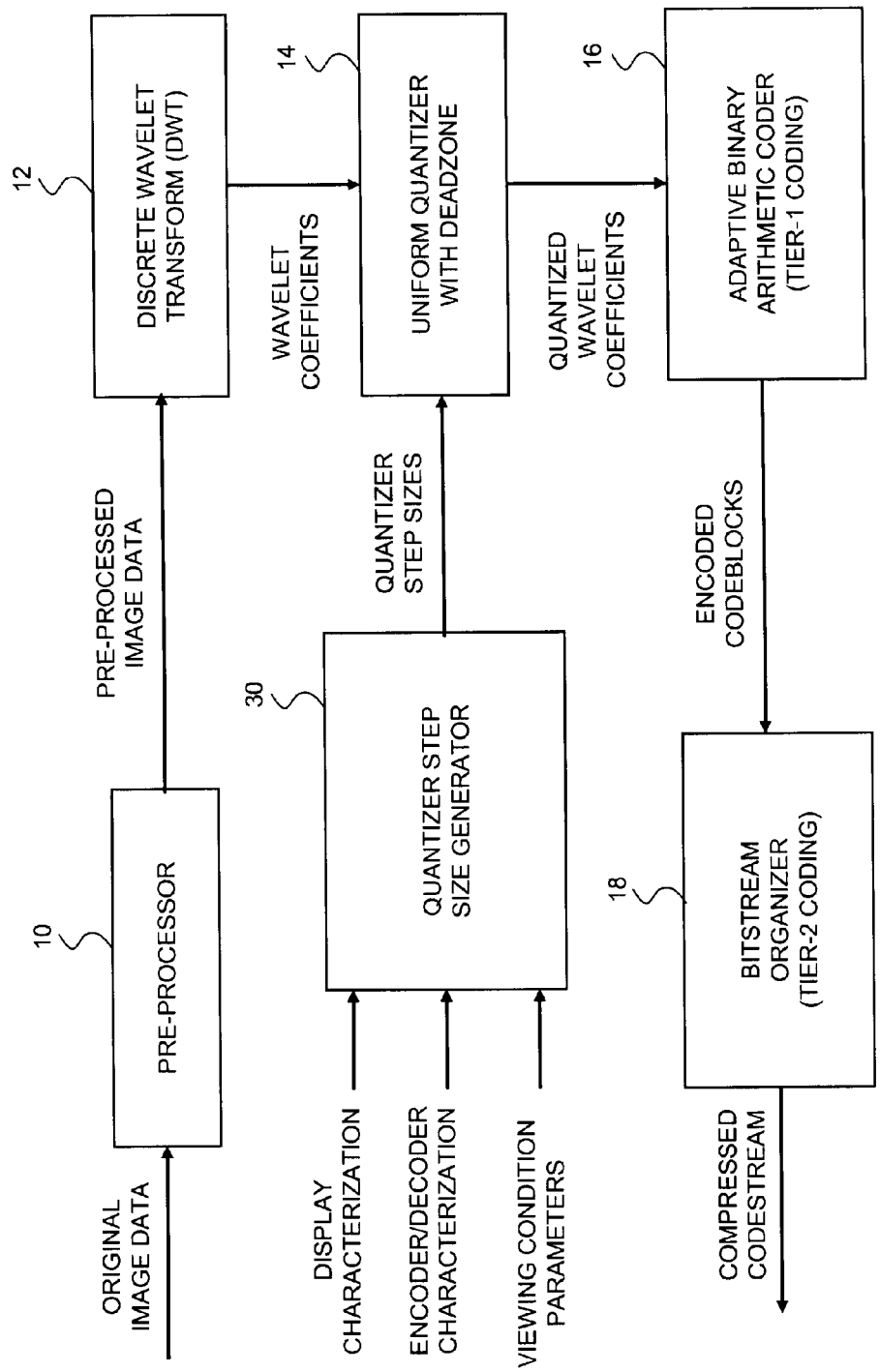
FIG. 9 is a block diagram of the present invention illustrating the generation of quantizer step sizes using viewing condition parameters and the characterizations of the encoder/decoder system and the display.

As illustrated in FIG. 9, the present invention includes a quantizer step size generator 30 in addition to the JPEG2000 encoder elements that are depicted in FIG. 1. The quantizer step size generator 30 generates the quantizer step sizes to be applied to the frequency subbands in the wavelet coefficient quantizer 14. The inputs to the quantizer step size generator are the viewing condition parameters (which includes the viewing distance in picture heights, screen heights, or other similar units), the display characterization of the contrast delta for a one CV input delta, and the JPEG2000 encoder/decoder system characterization of the quantizer step sizes that produces a one CV delta in the decompressed image.

Figure 10:
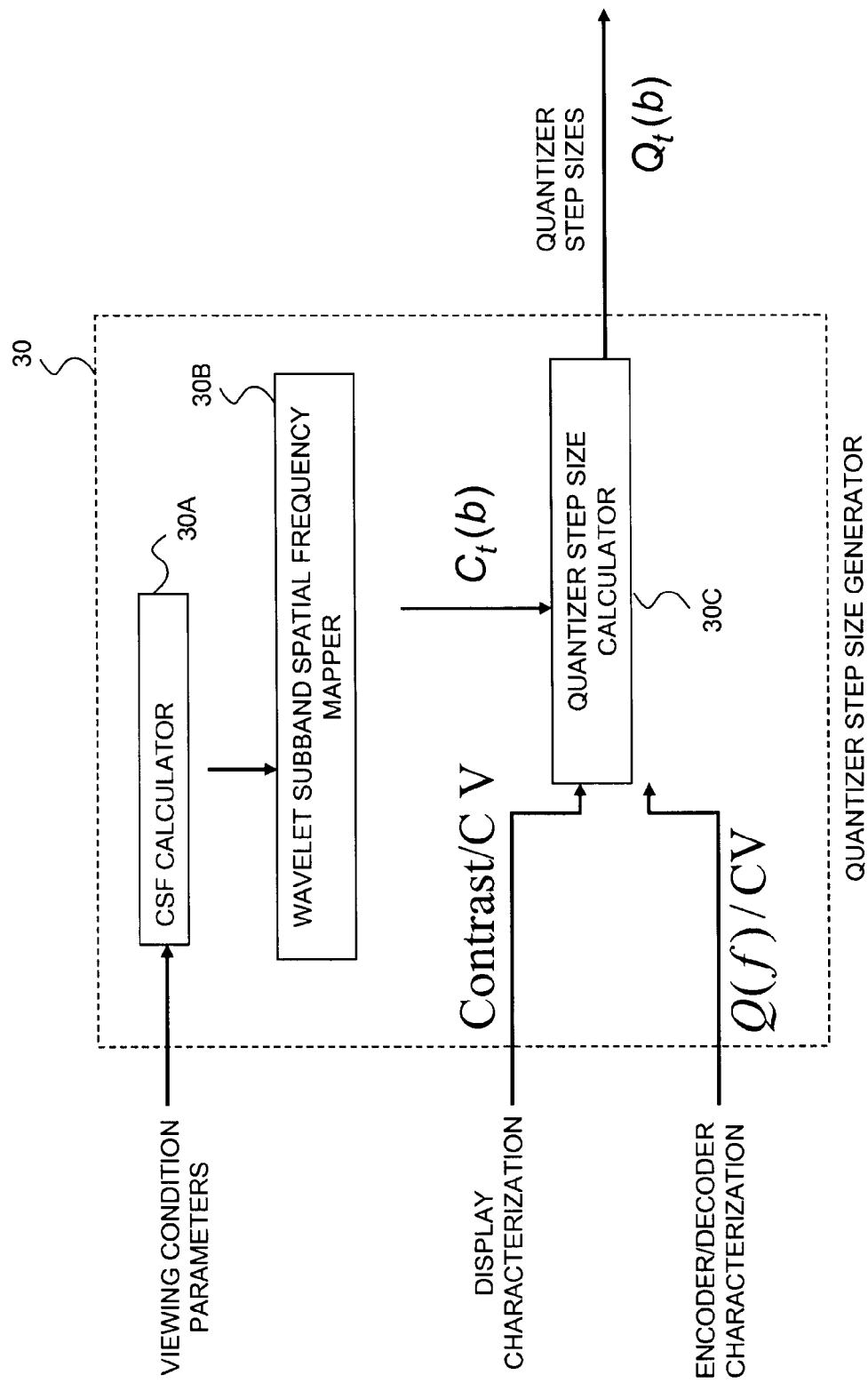
FIG. 10 is a block diagram of the quantizer step size generator of the present invention.

Referring to FIG. 10, the quantizer step size generator 30 shown in FIG. 9 includes: a CSF calculator 30a that takes the viewing condition parameters as input; a wavelet subband spatial frequency mapper 30b that uses the CSF values to determine the contrast threshold $C_t(b)$ for each of the wavelet subbands; and a quantizer step size calculator 30c that uses the display characterization (Contrast/CV), the JPEG2000 encoder/decoder characterization (Q(b)/CV), and the contrast thresholds ($C_t(b)$) to calculate the quantizer step sizes for the wavelet subbands using the formula given in Eq. 4.

The present invention has the advantage of the viewing distance being specified in picture heights, screen heights, or similar units that are independent of the specific size of the display. In an application such as the projection of movies using a Digital Cinema system, a movie can be compressed with the present invention to a quality level that is specified by a threshold viewing distance, and a customer is assured that the image quality will be the same regardless of the screen size on which the movie is shown. Another advantage is that the present invention can be practiced with most JPEG2000 encoders without any modifications as most encoders are designed to accept user-specified quantizer step sizes as input values.

In one embodiment of the present invention, the intended viewing conditions are specified and the corresponding threshold quantizer step sizes are determined from the CSF model and the other system characterizations as described previously. These step sizes are used to compress an image so that the decompressed and displayed image will have perceived quality that is identical to the original, uncompressed image when both images are viewed under the intended display conditions, i.e., the compression is visually lossless for the intended display conditions. In this approach, overcoding is obviously minimized because the threshold quantizer step sizes will produce the minimum amount of information that is needed for the desired quality level, and thus the Tier-1 coding encodes only this minimum amount of information. This compression system is inherently a VBR system, because the amount of compressed data in the final codestream will depend upon the image content.

However, even with this type of VBR system, it may still be the case that there is a constraint on the maximum amount of compressed data for each image, as such is the case for DCI-compliant codestreams for JPEG2000 compression of image sequences. To meet such a constraint, the present invention includes an additional rate control algorithm such as PCRD-opt during Tier-2 encoding to insure that all size constraints are met. The amount of compressed data can be compared to a pre-specified maximum amount, and the rate control during Tier-2 coding can reduce the amount of compressed data if the maximum amount is exceeded. For a visually lossless VBR system as described in the present invention, these maximum size constraints are typically larger than the actual compressed size because the visually based quantization will produce small compressed sizes for most image content. Thus, trimming of additional compressed data during Tier-2 coding typically doesn't occur and will be minimal even in the worst case, so overcoding is minimal.

In the case where trimming of compressed data occurs because of the codestream size constraints, the resulting image is no longer assured to be visually lossless for the intended viewing conditions. It is possible, however, to compute a new threshold viewing distance for such modified images, using the method described in U.S. Pat. No. 6,650,782, as a way to quantify the possible losses in image quality. However, for DCinema applications using the DCI-specified size constraints, the compressed data is rarely trimmed for typical viewing conditions, and moreover, the amount of trimming is small even when it does occur. Thus, in practice, this VBR method provides nearly constant perceived quality, which is visually lossless for the specified threshold viewing distance (and all greater viewing distances) for the majority of images that are compressed.

While the aforementioned embodiments of the present invention overcome a limitation of the prior art by reducing the computational complexity, these embodiments may still make use of a PCRD-opt or a similar rate control algorithm during Tier-2 coding to ensure that constraints on the maximum compressed codestream size are met. This is an advantageous way to meet size constraints as most JPEG2000 encoders include some form of PCRD-opt, and thus the present invention can be practiced with such encoders without further modification.

As noted previously, PCRD-opt uses MSE as the distortion metric, and MSE may not necessarily correlate well with perceived quality. However, the use of PCRD-opt and MSE in trimming the encoded data with the present invention is much less of a problem than it is in typical JPEG2000 encoders that produce finely quantized wavelet coefficients. In these prior art methods, every coding decision is based upon MSE (and the corresponding rate changes) when compressed data is discarded, and there is no assurance that such coding decisions will lead to perceived image quality that is optimal for the size of the final compressed codestream. In contrast, the present invention makes the majority of the coding decisions during the quantization phase, and as a result, the data that is passed to the Tier-1 coding and subsequently to the Tier-2 coding has already been restricted to a limited amount of data that has a very strong perceptual relevance.

Figure 11:
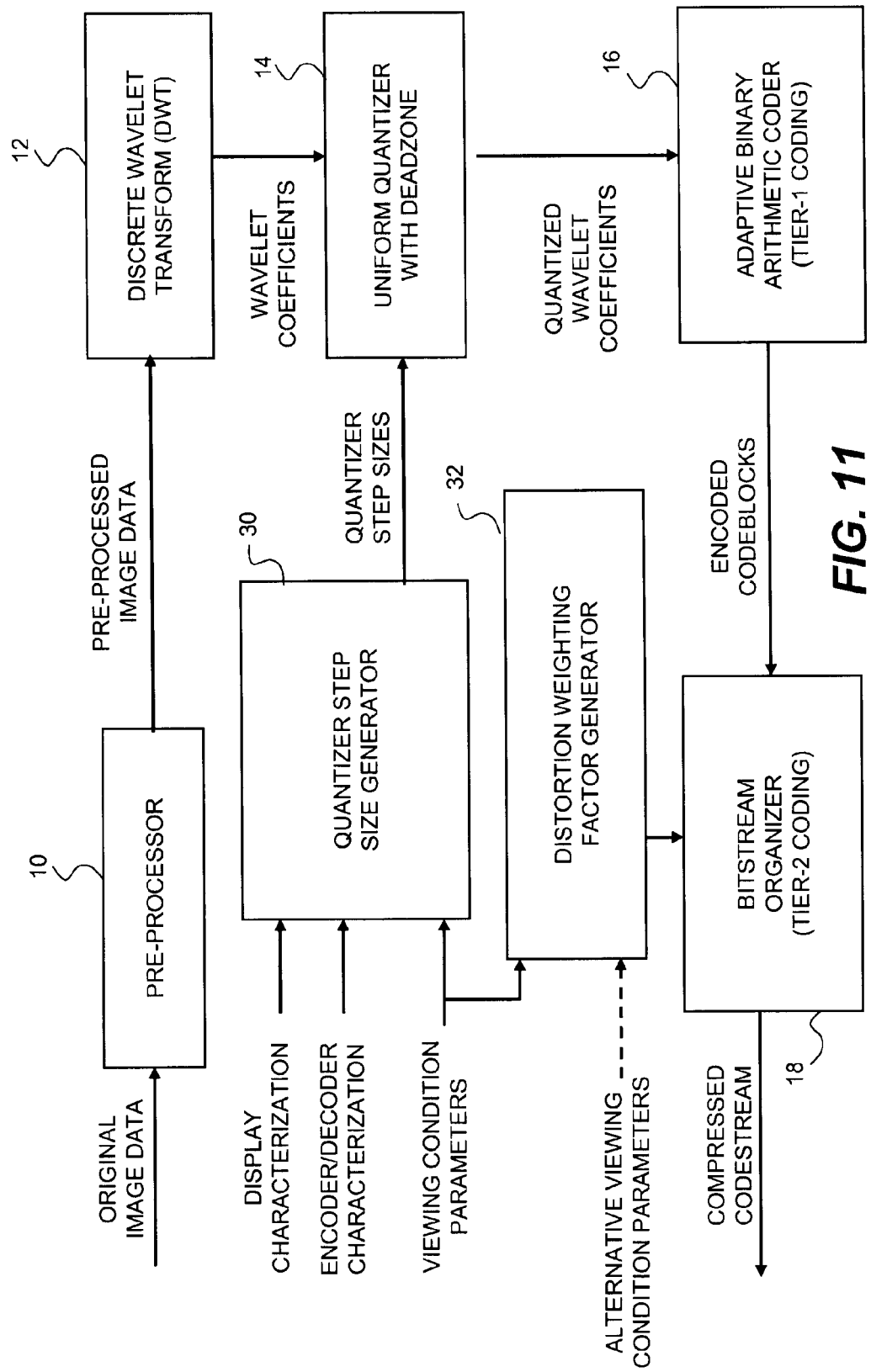
FIG. 11 is a block diagram of the present invention illustrating the generation of distortion weighting factors using viewing condition parameters.

In the case of VBR coding with the present invention, the amount of trimming in Tier-2 coding is inconsequential for most images, so the resulting compressed image will provide nearly constant perceived quality. To ensure that any coding decisions that are made during Tier-2 coding are optimal in terms of image quality, one can further employ a visual model during Tier-2 coding. This is accomplished by using visually based distortion weighting factors when computing the distortion for a PCRD-opt algorithm or a similar method. A distortion weighting factor can be assigned to each wavelet frequency subband, and the weighting factor is then used to determine the reduction in MSE that is contributed by a particular coefficient in a given subband. This process is illustrated in FIG. 11, where the viewing conditions are input parameters to a distortion weighting factor generator 32 that generates the visually based weighting factors to be used by a PCRD-opt or similar algorithm in the Tier-2 coding 18. The human visual system model that is used to determine the weighting factors is typically based upon a CSF model as described previously and as illustrated in FIGS. 5 and 6. However, it should be noted that the quantizer step size and the weighting factor for each of frequency subbands are not the same value, nor do the step sizes and weighting factors necessarily share the same relationship across all of the subbands. This is because the processes of quantization and visual weighting of MSE are fundamentally different, and so the relationships of the subbands to one another are different for the two processes.

The use of visually based weighting factors for MSE distortion calculations is well known in the prior art, but the use of a threshold viewing distance in determining both the visually based quantization of the wavelet coefficients as practiced in the present invention and the subsequent coding decisions based upon visually weighted MSE provides advantages over the prior art. As discussed previously, by limiting the amount of overcoding using a visual model for the intended viewing conditions, the resulting compressed codestream is nearly optimal in terms of perceived quality and size for those viewing conditions. If it is necessary to trim compressed data to meet constraints on the maximum amount of compressed data, the visual weighting of the MSE can help ensure that the discarded data will have the least effect on the perceived image quality that is produced by smaller compressed codestream.

As illustrated in FIG. 11, one could use the same viewing conditions that were used for determining the quantizer step sizes as input to the distortion weighting factor generator 32. The effect of using visually based weighting factors that are derived from same viewing conditions is that the distortions corresponding to the higher spatial frequencies are typically weighted to lower values, meaning that the compressed data for the higher spatial frequencies will be preferentially discarded during the rate-distortion optimization of PCRD-opt. This leads to images that may have slightly lower sharpness than desired, but it minimizes the potential for objectionable artifacts to be introduced. Observers are more tolerant of a slight loss of image sharpness than they are to unnatural coding artifacts.

However, it can also be advantageous to use one or more alternative viewing condition parameters as inputs to the distortion weighting factor generator 32 to produce the weighting factors for the distortion calculations, as further illustrated in FIG. 11. An example of this approach is determining the weighting factors using a greater viewing distance than the threshold viewing distance that was used to generate the quantizer step sizes. With this method, compressed data that corresponds to the higher spatial frequencies are much more likely to be discarded than the data for the lower spatial frequencies in meeting the compressed size constraint. This is particularly important for VBR coding, where the coefficients have already been quantized to threshold levels. Any additional compression errors will occur at the higher frequencies with the visual weighting that was just described, which is equivalent to quantizing according to a greater threshold viewing distance than was originally specified. Again, this type of data reduction discards the least perceptually relevant compressed data.

It can be further advantageous to apply very large weighting factors to the lower spatial frequency subbands to fully ensure that no data is discarded from these subbands. When the low frequency subbands are already quantized to visually lossless levels, it is preferable to not introduce any additional distortion into these frequency subbands as the resulting image quality can be significantly affected. However, whether the same or different viewing conditions are used when calculating the visually based quantizer step sizes and weighting factors, the effect of the visual weighting factors is to ensure that the least perceptually relevant data is discarded when trimming the compressed data to meet a maximum codestream size constraint.

In the preceding discussion, no mention has been made of the color components that typically comprise an image. In another embodiment of the present invention, a separate set of quantizer step sizes is determined for each color component, where each set is tuned for the overall compression/decompression/display chain. For example, the three sets of optimal quantizer step sizes for an image compressed as RGB color channels are different from the sets of optimal quantizer step sizes for an image that has been pre-processed with the ICT to convert the RGB data to YCbCr data prior to compression. This is because the errors that are introduced into the quantized wavelet coefficients for each color channel are amplified or diminished in different ways as the compressed data is decompressed, processed with the inverse ICT if necessary, and converted to color signals on the display. Similar variations in the perceptibility of errors in the different color channels occur for data representing image color components that correspond to a different color primary set (such as XYZ instead of RGB) and for displays with different primary sets (e.g., RGB P3 or RGB 709 primaries). Likewise, it is desirable to adjust the visual weighting factors for any MSE calculations based upon the properties of the different color channels, because some color channels are perceptually more important, e.g. the green color channel, while other are less perceptually relevant, e.g., the blue color channel. Given knowledge of the specific image color representation and display color characteristics, it is straightforward to determine the optimal quantizer step sizes and weighting factors for the different color channels through either direct numerical calculations or simple observer experiments.

In addition to constraints on the amount of compressed data for a single frame or frame component, there may also be a constraint on the total amount of compressed data that is used to represent all of the image frames that comprise an image sequence. As mentioned previously, a constraint on the total amount of compressed data for an image sequence allows one to be assured that a movie of a given duration will fit onto a storage media with a certain capacity, e.g., a two-hour movie compressed onto a 160 Gbyte hard drive. A constraint on the total codestream size is also advantageous in systems where the compressed data is to be transmitted over a communications network, such as satellite delivery of the compressed movie content to movie theaters.

A constraint on the total size of the compressed codestream is equivalent to a constraint on the average compressed data rate over the entire sequence, and the following discussion will use average data rate instead of total filesize for convenience. For example, if one has a movie that is 2 hours in length and wishes to fit the compressed movie onto a 160 Gbyte hard drive, the average compressed data rate must be less than 182 Mbps. Because of the variable bit rate encoding, some frames will use a higher instantaneous compressed data rate (up to the maximum of 250 Mbps in the case of DCI-compliant codestreams), while other frames will use an instantaneous data rate that is substantially less than 182 Mbps. Despite the variation in instantaneous compressed data rate, the goal is to achieve constant perceived image quality for each frame subject to the constraint of the average compressed data rate, and to do so in an efficient manner to prevent any loss in workflow efficiency.

Figure 12:
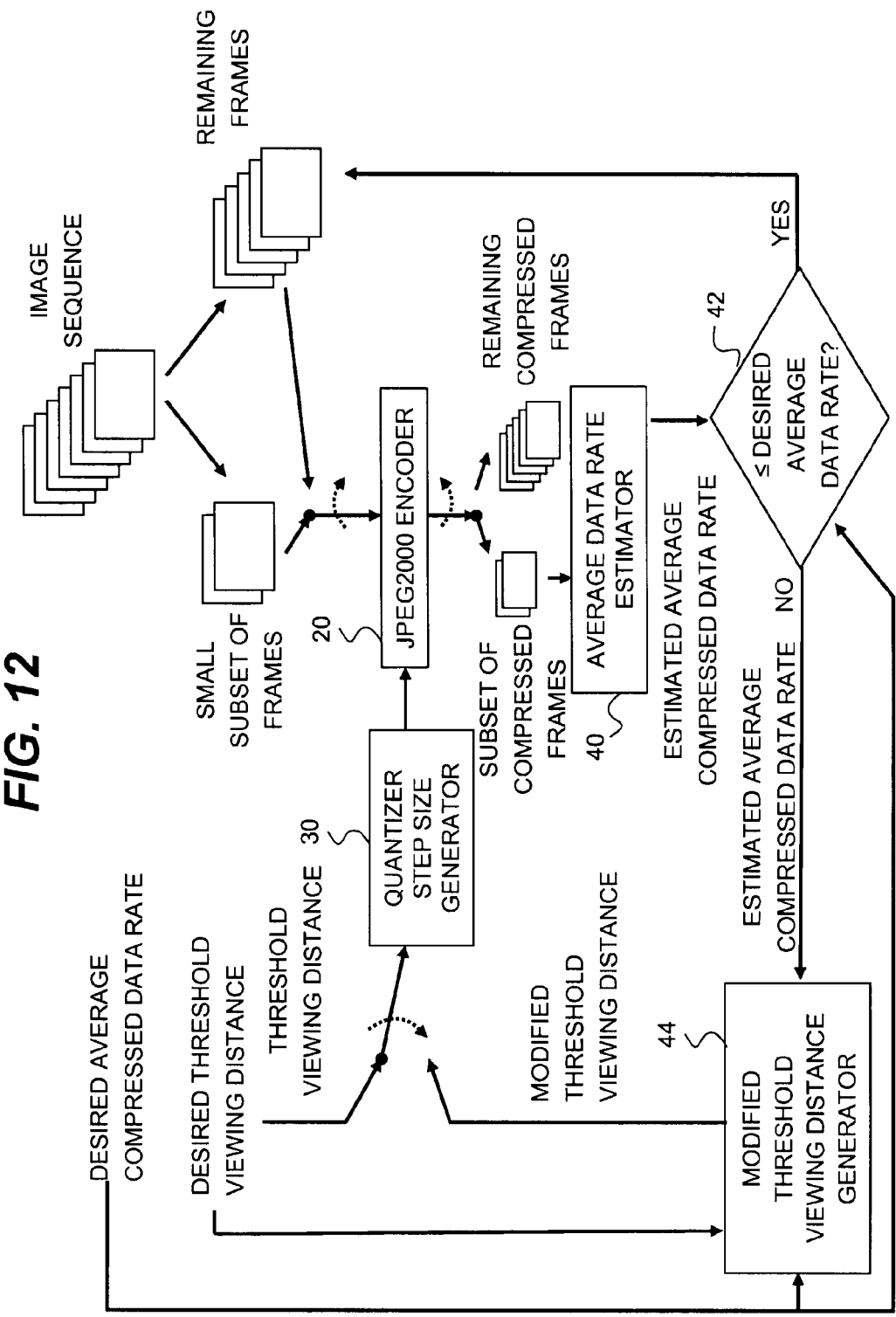
FIG. 12 is a block diagram of the present invention illustrating the compression of an image sequence to a desired average data rate.

This goal is met in an embodiment of the present invention by again using the image quality metric of threshold viewing distance. Referring to FIG. 12, a user supplies a desired average compressed data rate, along with a desired threshold viewing distance as an initial quality specification. The user may also provide other viewing condition parameters besides the threshold viewing distance as described previously. The desired threshold viewing distance is provided as input to quantizer step size generator 30, which was described previously and shown in FIG. 10, to compute an initial set of compression parameters, i.e., quantizer step sizes. The user also provides the desired average compressed data rate and the desired threshold viewing distance as inputs to modified threshold viewing distance generator 44, which is described shortly hereafter. In addition, the desired average compressed data rate is provided as input to comparison logic 42, which is also described shortly hereafter.

Again referring to FIG. 12, the set of image frames that comprise the original image sequence is divided into two subsets. One subset, denoted as subset #1, contains only a small number of frames, typically 1 to 2% of the total number of frames, and the other subset, denoted as subset #2, contains all remaining frames that are not in the small subset. The small subset of frames (subset #1) can be selected by random temporal sampling of the image sequence, although a fixed temporal sampling interval has been found to work very well in practice and it is easier to implement than a random sampling interval. Other sampling strategies may also be used, such as selecting frames according to specific scene content, if such information is available.

Each frame in subset #1 is compressed in its entirety using the initial set of compression parameters with JPEG20000 encoder 20 to produce a subset of compressed frames. The average compressed data rate for the compressed frames of subset #1 is computed using an average data rate estimator 40, where the average compressed data rate is simply the average of the compressed data rates that are associated with the individual frames in subset #1. The average compressed data rate for subset #1 is used as an estimate of the average compressed data rate for the entire sequence. This method of sparse temporal sampling works well with motion picture data, because the frame-to-frame correlation is typically high, and a sparse temporal sampling throughout an image sequence will provide a very good estimate of the average data rate for the entire sequence. However, it is noted that this approach of forming a subset of image frames to estimate the average compressed data rate could also be applied to any set of images, not just a motion image sequence, as long as there is sufficient similarity of the image content for the images in the small subset and the remaining images in the set.

The estimated average compressed data rate is compared to the desired average compressed data rate using comparison logic 42. If the estimated average data rate is less than or equal to the desired average data rate, the subset of remaining frames (subset #2) can be compressed with JPEG2000 encoder 20 using the same compression parameters as were used for subset #1 to produce a set of compressed remaining frames. Together, the small subset of compressed frames (from subset #1) and the subset of compressed remaining frames (from subset #2) comprise the entire set of compressed frames. Note that there is no need to recompress subset #1 if the average rate constraint is met on this first compression pass, so there is no overhead incurred on the total compression time if only one compression pass is needed to achieve the desired average compressed data rate with for subset #1.

If the estimated average data rate is larger than the desired average data rate, the threshold viewing distance is modified using modified threshold viewing distance generator 44. Specifically, the threshold viewing distance is increased, which will reduce the compressed filesize (and hence, reduce the average data rate) by allowing more errors to be introduced when the new quantizer step sizes are computed by the quantizer step size generator 30 with the larger threshold viewing distance. The use of a larger threshold viewing distance will introduce detectable errors in the higher spatial frequencies when the content is viewed at the desired closer viewing distance, but subjective testing has shown that the loss in quality due to a change in the viewing distance is fairly small with typical viewing conditions in DCinema environments.

Figure 13:
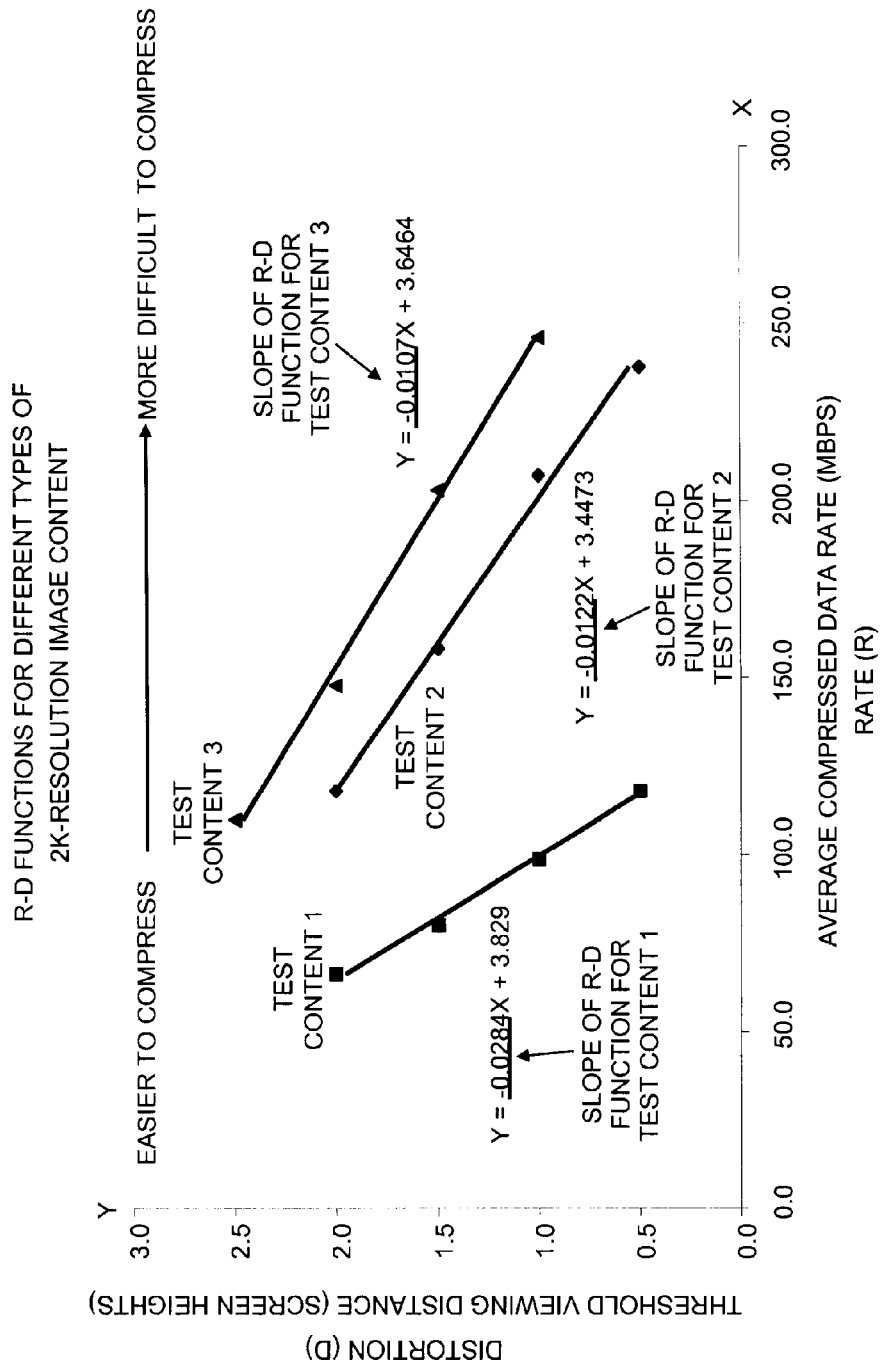
FIG. 13 is an illustration of an example of rate-distortion functions for different types of image sequence content.

The modification of the threshold viewing distance to meet a given average data rate using modified threshold viewing distance generator 44 is controlled by a rate-distortion (R-D) function. In the visually lossless VBR system, the distortion is quantified by the threshold viewing distance in screen heights (or a related unit of measurement as described previously), and the rate is quantified by the average compressed data rate in convenient units, such as Mbps. The R-D function is dependent upon the image content, and examples of R-D functions are shown in FIG. 13 for three different types of 2K-resolution movie content. Test content 1 is computer graphics originated content that is fairly easy to compress because it contains no noise, while test content 2 and 3 are film-originated and are more difficult to compress because they contain film grain noise. Other types of content could also be considered, such as digital camera origination, which would yield yet another R-D function. In addition to the origination source of the content, the actual scene content will affect the R-D function. For example, the frames in a sequence may contain large areas of fine detail, which will be more difficult to compress than frames that have large uniform areas.

In the R-D function examples in FIG. 13, the relationship between the average compressed data rate and the threshold viewing distance is fairly linear regardless of the source of the image content. In general, an R-D function is not a straight line, but the threshold viewing distances and average data rates that are of interest in DCinema applications both span only a limited range, and a linear model is generally sufficient to model the relationship. This means that if one has any two points on the R-D curve for given content, the modified threshold viewing distance generator 44 can linearly interpolate or extrapolate to find the threshold viewing distance that will achieve a desired average compressed data rate.

However, the first compression pass through small subset of frames (subset #1) provides only one point on the R-D function. Until a second compression pass through the small subset of frames is completed, the linear function for the R-D curve is not known. So the question that arises in performing the second compression pass is how much should the threshold viewing distance be adjusted by the modified threshold viewing distance generator 44 when calculating new quantizer step sizes for the second pass using quantizer step size generator 30? Ideally, the second pass with subset #1 would achieve an estimated average compressed data rate that meets the desired average rate constraint so that additional compression passes become unnecessary. To determine a modified threshold viewing distance that will achieve the desired average compressed data rate, it is necessary to know the slope of the R-D function to characterize the linear relationship, but this slope is strongly dependent on the type of content as described previously and shown in FIG. 13. It is possible to develop heuristics based upon a characterization of the content and capture device (e.g., CGI animation, high-speed vs. slow speed origination film, etc.). However, a simpler and more efficient approach is to use the average compressed data rate from the first compression pass with the small subset of frames (subset #1) to estimate the slope of the R-D curve.

Figure 14:
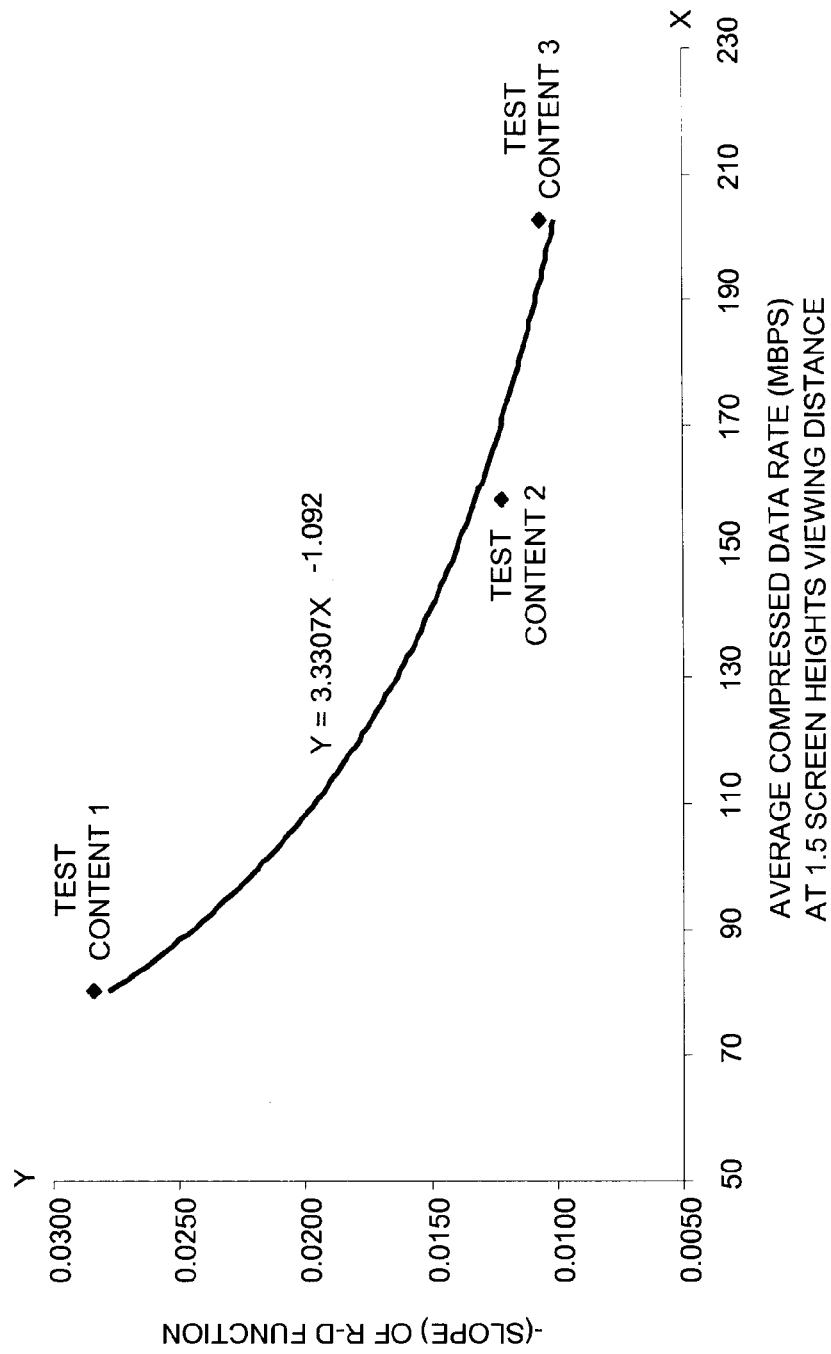
FIG. 14 is an illustration of the relationship between the average compressed data rate and the slope of the rate-distortion function for a threshold viewing distance of 1.5 screen heights.

As an example, consider a system where the first pass on subset #1 is always performed using compression parameters that correspond to a threshold viewing distance of 1.5 screen heights. The relationship between the average data rate at 1.5 screen heights and the slope of the R-D curve can be predetermined for different types of content. An example of this predetermined relationship is illustrated in FIG. 14, using the data that was shown in FIG. 13 for the three sets of test content. Note that the ordinate in FIG. 14 is plotted as —(slope of R-D function) for convenience. In practice, the R-D functions and associated slopes would be computed for many different sets of test content to derive a more robust estimator than the one shown in FIG. 14, which is based on only three sequences. In addition, it is possible to predetermine the relationship between the average compressed data rate and the R-D slope for a number of initial viewing distances if one does not wish to constrain the quality specification to a single value such as 1.5 screen heights for the initial threshold viewing distance.

Figure 15:
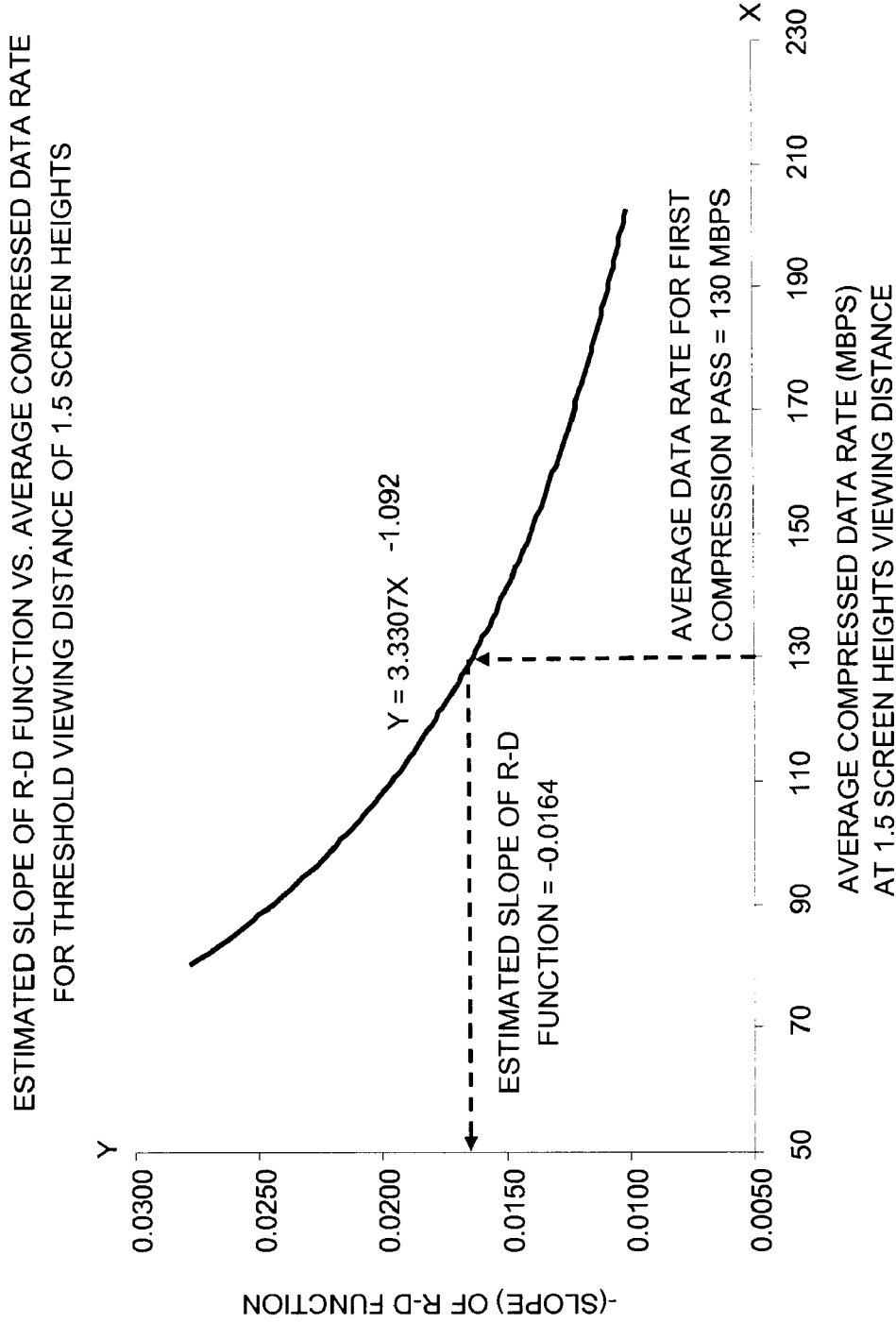
FIG. 15 is an illustration of the estimation of the slope of the rate-distortion function using the average compressed data rate for a first compression pass with a threshold viewing distance of 1.5 screen heights.

Given the average data rate from the first compression pass with the small subset of frames (subset #1) with the example viewing distance of 1.5 screen heights, a function like the one shown in FIG. 14 can be used by the modified threshold viewing distance generator 44 to estimate the slope of the linear R-D function for the content that is being compressed. As an example, FIG. 15 illustrates a first compression pass on the small subset of frames using a viewing distance of 1.5 screen heights that produces an average compressed data rate of 130 Mbps. Using the predetermined relationship as in FIG. 14, the estimated slope of the R-D function for this small subset of frames is −0.0164.

Figure 16:
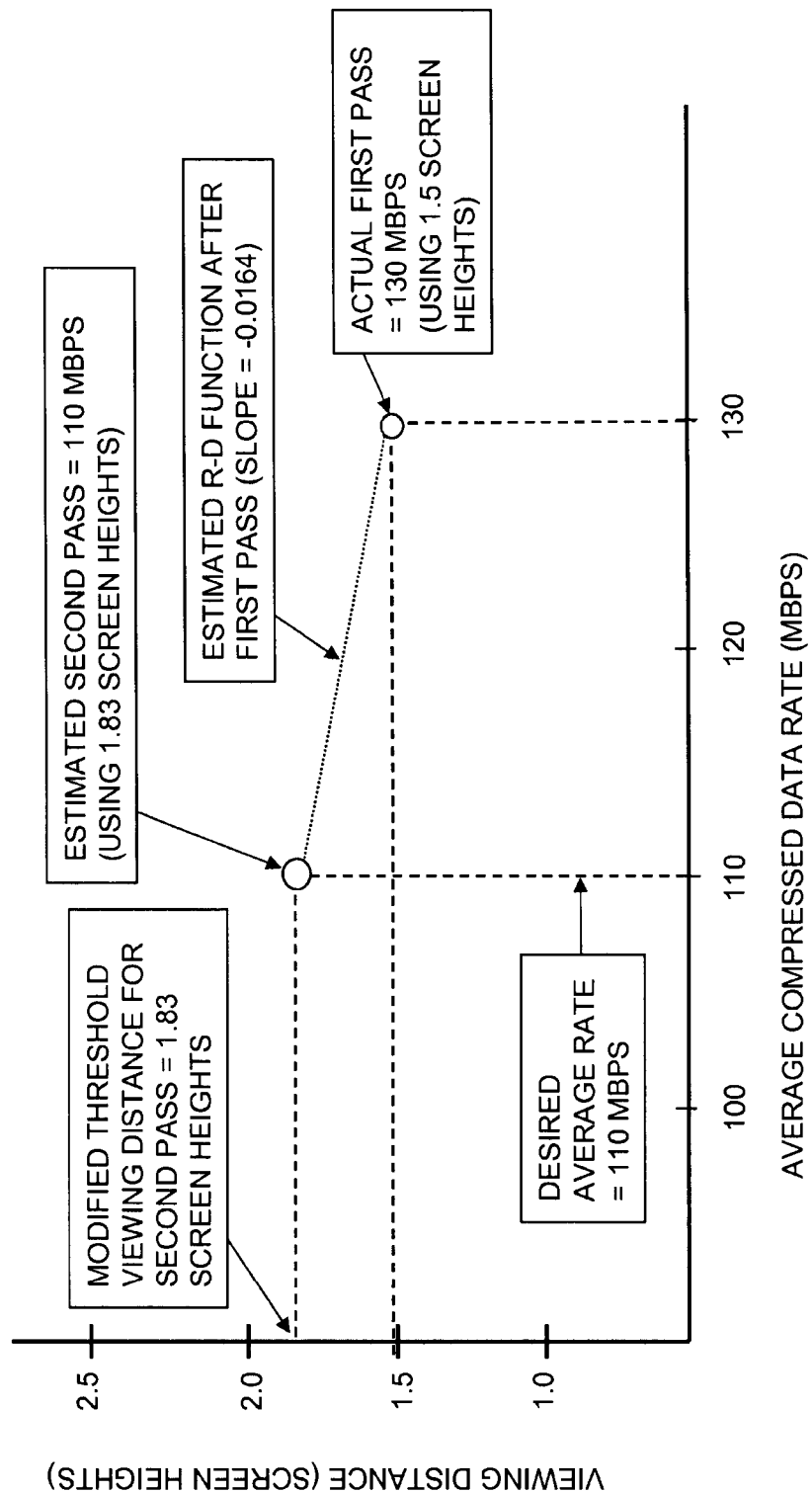
FIG. 16 is an illustration of modifying the threshold viewing distance for a second compression pass using an estimated rate-distortion function.

Now suppose that the desired average compressed data rate is 110 Mbps instead of the 130 Mbps that was actually achieved in the example using a threshold viewing distance of 1.5 screen heights. The threshold viewing distance must be modified from the initial value of 1.5 screen heights to a larger threshold viewing distance, and the corresponding quantizer step sizes are then computed for the second compression pass through the small subset of image frames (subset #1). Using the estimated slope of the R-D function, the modified threshold viewing distance is computed by modified threshold viewing distance generator 44 using:

$$\text{Modified threshold viewing distance} = \text{Current threshold viewing distance} + (\text{Slope of R-D curve}) \times (\text{Desired average data rate} - \text{Current average data rate}) \quad (5)$$

where the current threshold viewing distance and the current average data rate are the values associated with the first compression pass with subset #1. FIG. 16 illustrates an example of how a modified threshold viewing distance is determined so that the second compression pass is estimated to produce the desired average compressed data rate for the small subset of image frames. Using the estimated slope of the R-D function (=−0.0164) in this example, the modified threshold viewing distance to achieve the desired data rate of 110 Mbps is [1.5+(−0.0164)(110−130)]=1.83 screen height. The quantizer step sizes are computed for the second compression pass using this modified threshold viewing distance. The resulting average data rate from the second compression pass with subset #1 with the modified threshold viewing distance should be very close to the desired average data rate. If the average rate is less than or equal to the desired average rate constraint, the remaining frames (subset #2) can be compressed with the modified threshold viewing distance, and the overall compression process for the entire sequence is completed with minimal overhead.

Figure 17:
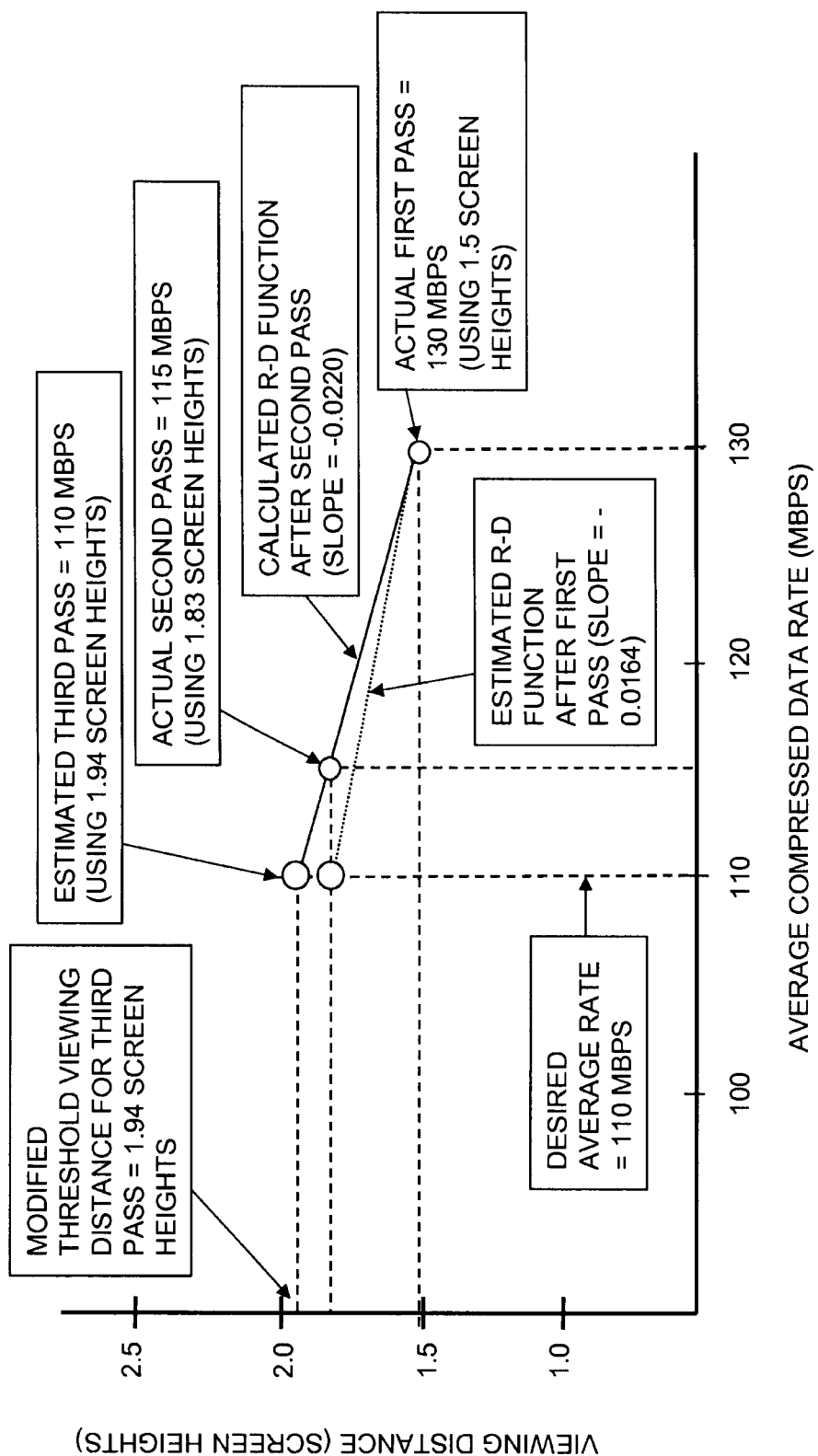
FIG. 17 is an illustration of modifying the threshold viewing distance for a third compression pass using a calculated rate-distortion function.

If the desired average data rate is still exceeded on the second compression pass with subset #1, the threshold viewing distance is modified again. However, rather than using an estimated slope as in FIG. 16, the slope of the R-D curve is calculated in the modified threshold viewing distance generator 44 using the actual results from the first two passes, i.e., $$\text{Slope of } R-D \text{ curve} = \frac{\left(\begin{array}{l}\text{Threshold viewing } dist. \text{ from current pass} - \\ \text{Threshold viewing } dist. \text{ from previous pass}\end{array}\right)}{\left(\begin{array}{l}\text{Average data rate from current pass} - \\ \text{Average data rate from previous pass}\end{array}\right)} \quad (6)$$

where the current pass and the previous pass are the second and first passes, respectively, for the small subset of frames (subset #1). Continuing the previous example, suppose that the actual average compressed data rate for the second pass is 115 Mbps, instead of the desired 110 Mbps. Using the actual average compressed rates and corresponding threshold viewing distances for the first and second passes for subset #1, the calculated R-D slope is [(1.83−1.50)/(115−130)]=−0.0220. Using this calculated slope, the threshold viewing distance can be modified again by the modified threshold viewing distance generator 44 using Eq. 5, where the current threshold viewing distance and the current average data rate are now the values associated with the second compression pass. The modified threshold viewing distance in this example is determined to be [1.83+(−0.0220)(110−115)]=1.94 screen heights. New compression parameters are computed by the quantizer step size generator 30 using the modified threshold viewing distance, and a third compression pass is performed on the small subset of frames (subset #1). FIG. 17 illustrates graphically how a modified threshold viewing distance is determined using the calculated R-D slope so that the third compression pass is estimated to produce a desired average compressed data rate of 110 Mbps for the small subset of image frames.

Figure 18:
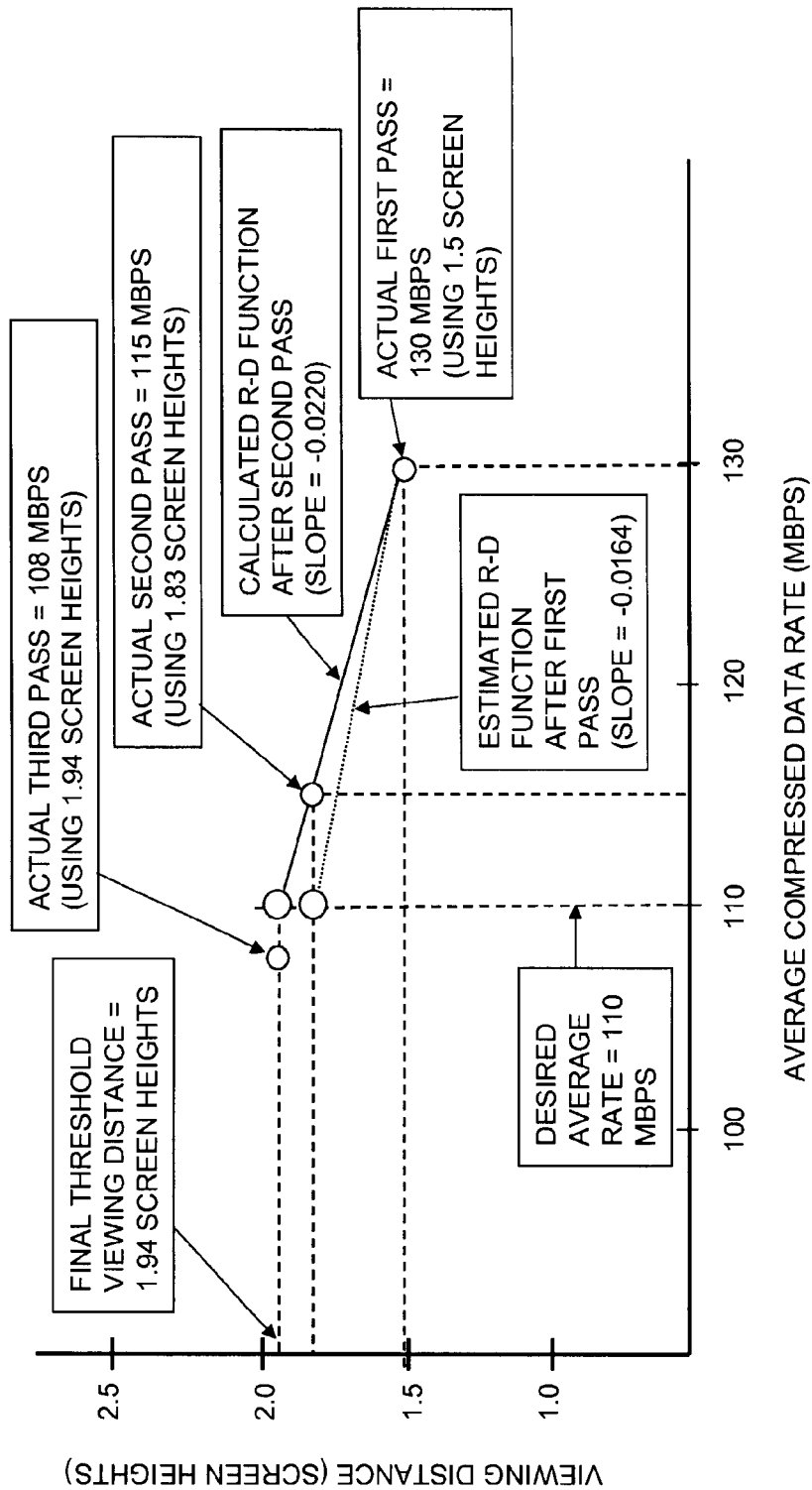
FIG. 18 is an illustration of achieving a desired average compressed data rate after a third compression pass with a final threshold viewing distance.
Figure 19:
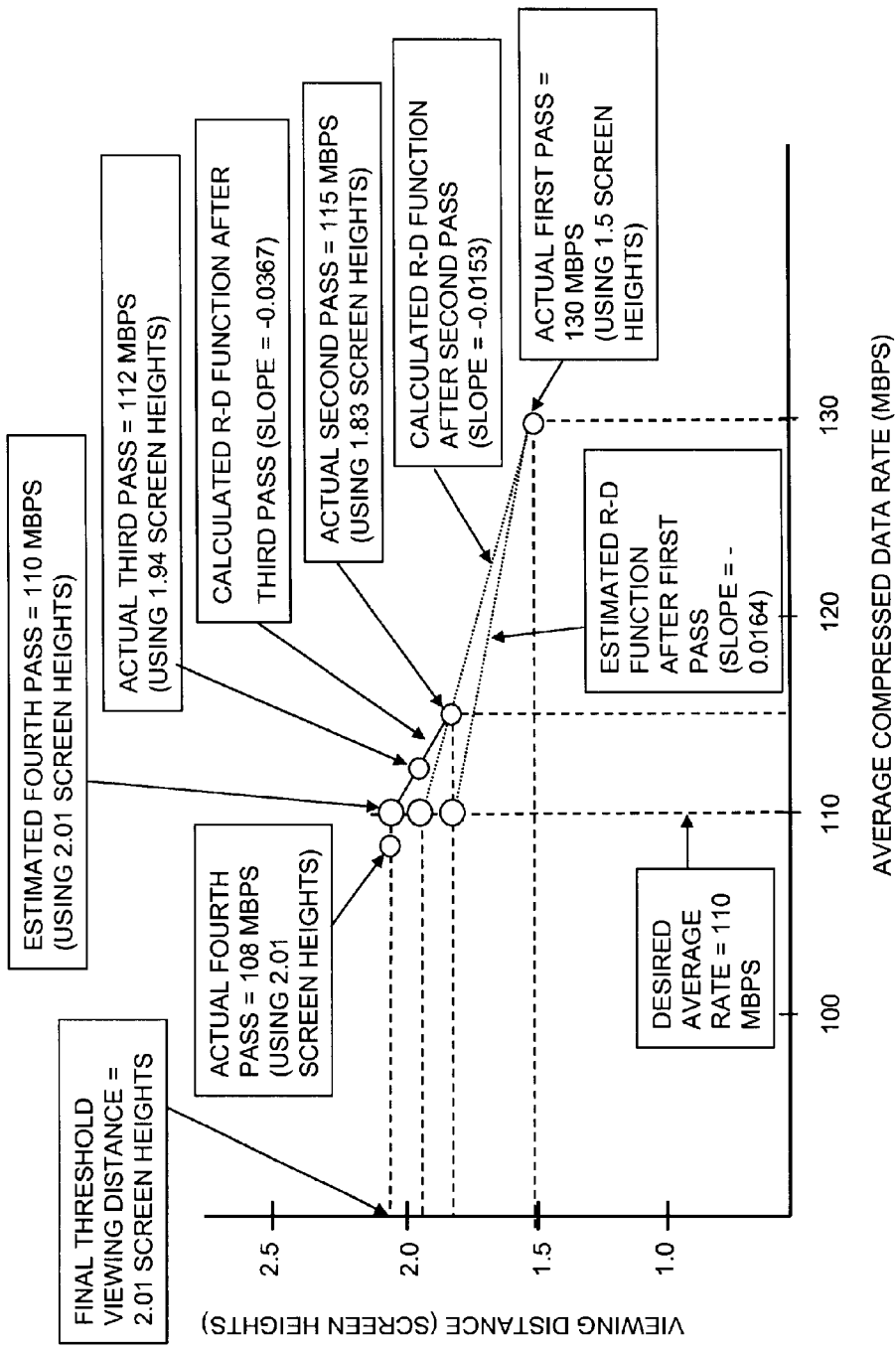
FIG. 19 is an illustration of modifying the threshold viewing distance for a fourth compression pass using a calculated rate-distortion function.

In most cases, a third compression pass is sufficient to assure that the average data rate constraint is met, as illustrated in FIG. 18. If the rate constraint is not met by the third pass, additional passes on subset #1 are performed using an updated R-D slope that is computed with each additional pass by the modified threshold viewing distance generator 44 using Eqs. 5 and 6, where the average compressed data rate and the threshold viewing distance are updated to reflect the current and previous compression passes. Continuing the previous example, suppose that the actual average compressed data rate after the third pass was 112 Mbps at 1.94 screen heights, instead of the desired 110 Mbps. The calculated R-D slope is now updated to [(1.94−1.83)/(112−115)]=−0.0367. The modified threshold viewing distance in this example for the fourth pass is determined to be [1.94+(−0.0367)(110−112)]=2.01 screen heights. The process for adjusting the viewing distance to achieve an average data rate with a fourth compression pass is illustrated graphically in FIG. 19. Additional compression passes can be performed using the same manner of adjustment for the threshold viewing distance until the desired average compressed data rate is achieved. Once the desired average compressed data rate is achieved for subset #1, the remaining frames (subset #2) are compressed using the same threshold viewing distance.

Although unlikely, it is also possible that the average rate constraint is met during one of the compression passes with subset #1, but the average compressed data rate is substantially less than the desired average rate. This can lead to lower image quality than is possible at the desired average rate, so the goal is to achieve an average rate that is very close to the desired rate without exceeding it. If this situation occurs, another compression pass with subset #1 may be advantageous, and Eqs. 5 and 6 can be used to calculate a modified threshold viewing distance that will achieve an average compressed data rate that is closer to the desired average rate.

If subset #1 consists of only 1-2% of the frames (selected from throughout the full image sequence to get a good representation of the image content), the total overhead for the multi-pass rate control is typically less than 5-10%, depending upon the number of passes that are required. This is likely to be an acceptable penalty on the overall workflow if it is necessary to achieve a given average compressed filesize.

Another advantage of using this visually based method for constraining the total codestream size is that the final threshold viewing distance can be reported back to the user. This provides a means for the user to assess the image quality of the compressed sequence when the average data rate is constrained. For example, the desired threshold viewing distance might be 1.5 screen heights, but the desired average data rate was actually achieved using a viewing distance of 1.91 screen heights, as illustrated in the example of FIG. 18. By reporting the final threshold viewing distance of 1.91 screen heights, the user now knows the impact of average rate constraint on the image quality. This change in threshold viewing distance could also be converted to deltas of just noticeable differences (ΔJNDs) of quality if appropriate observer studies have been performed to establish the relationship between changes in the threshold viewing distance and changes in perceived quality at various actual viewing distances.

Thus, what is provided is a method for controlling the compressed size of JPEG2000 images in a manner that is more efficient than existing encoders, and the method also ensures that the size of the compressed data meets any constraints on the maximum amount of compressed data. In at least one embodiment, the method provides nearly constant perceived image quality for the images that comprise an image sequence, with the ability to meet constraints on the amount of compressed data for an individual frame or frame component and on the amount of compressed data for the entire image sequence in a very efficient manner.

Moreover, the present invention can be practiced with most existing JPEG2000 encoders, both hardware and software. The only requirements are that the encoder: (1) accepts explicit quantizer step sizes as inputs to the quantizer and (2) provides a means for reducing the amount of compressed data if pre-specified maximum limits are exceeded, where such means include, but are not limited to, common rate control techniques such as PCRD-opt.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware or firmware known as application specific integrated circuits (ASIC's) or as programmable digital logic chips, such as field programmable gate arrays (FPGAs).

The invention has been described in detail with particular reference to certain preferred embodiments thereof, but it will be understood that variations and modifications can be effected within the spirit and scope of the invention.

PARTS LIST

10 Pre-processor
12 Discrete wavelet transform
14 Uniform quantizer with dead zone
16 Adaptive binary arithmetic coder
18 Bitstream organizer
20 JPEG2000 encoder
22 JPEG2000 decoder
24 Display device
30 Quantizer step size generator
30a CSF calculator
30b Wavelet subband spatial frequency mapper
30c Quantizer step size calculator
32 Distortion weighting factor generator
40 Average data rate estimator
42 Average compressed data rate comparison logic
44 Modified threshold viewing distance generator

The invention claimed is:

1. A method for compressing a set of sequential digital images to achieve an average compressed data rate for the set of images, comprising the steps of:
   (a) specifying a threshold viewing distance and a desired average compressed data rate;
   (b) selecting a small subset of images from the set of sequential images;
   (c) applying the threshold viewing distance as an input for computing compression parameters;
   (d) compressing the small subset of images with the compression parameters to produce compressed data;
   (e) calculating an average compressed data rate for the small subset of images;
   f) comparing the average compressed data rate for the small subset of images to the desired average compressed data rate;
   g) compressing remaining images from the set of images that are not in the small subset of images, if the average compressed data rate for the small subset of images is less than or equal to the desired average compressed data rate, using the compression parameters that were used for the small subset of images without recompressing the small subset of images;
   h) otherwise, modifying the threshold viewing distance and repeating above steps c) through h).

2. The method according to claim 1, wherein modifying the threshold viewing distance of step h) after a first compression pass through the small subset of images further comprises using the average compressed data rate and the threshold viewing distance to determine an estimates, slope for a rate-distortion function and using the estimated slope to compute a modified threshold viewing distance that will achieve the desired average compressed data rate.

3. The method according to claim 2, wherein modifying the threshold viewing distance of step h) after a second compression pass through the small subset of images further comprises using the average compressed data rate and the threshold viewing distance from the first compression pass and the average compressed data rate and the threshold viewing distance from the second compression pass to determine a calculated slope for a rate-distortion function and using the calculated slope to compute a modified threshold viewing distance that will achieve the desired average compressed data rate.

4. The method according to claim 3, wherein modifying the threshold viewing distance of step h) after at least a third compression pass through the subset of images further comprises using the average compressed data rate and the threshold viewing distance from the previous compression pass and the average compressed data rate and the threshold viewing distance from the current compression pass to determine a calculated slope for a rate-distortion function and using the calculated slope to compute a modified threshold viewing distance that will achieve the desired average compressed data rate.

5. A computer program stored on a non-transitory computer readable medium for performing the method of claim 4.

6. A computer program stored on a non-transitory computer readable medium for performing the method of claim 3.

7. A computer program stored on a non-transitory computer readable medium for performing the method of claim 2.

8. The method claimed in claim 1, wherein the threshold viewing distance is input into a contrast sensitivity function calculator for computing the compression parameters.

9. The method claimed in claim 8, wherein the compression parameters are quantizer step sizes.

10. A computer program stored on a non-transitory computer readable medium for performing the method of claim 9.

11. A computer program stored on a non-transitory computer readable medium for performing the method of claim 8.

12. A computer program stored on a non-transitory computer readable medium for performing the method of claim 1.

13. A JPEG2000 variable bit rate (VBR) compression method for producing constant perceived image quality of a set of sequential images while minimizing the amount of compressed data to achieve the aforementioned image quality, wherein the method comprises the steps of:
(a) specifying a threshold viewing distance and a desired average compressed data rate;
(b) selecting a small subset of images from the set of sequential images;
(c) applying the threshold viewing distance as an input to a quantizer step size generator for computing compression parameters;
(d) compressing the small subset of images with the compression parameters to produce compressed data;
(e) calculating an average compressed data rate for the small subset of image;
f) comparing the average compressed data rate for the small subset of images to the desired average compressed data rate;
g) compressing remaining images from the set of images that are not in the small subset of images, if the average compressed data rate for the small subset of images is less than or equal to the desired average compressed data rate, using the compression parameters that were used for the small subset of images without recompressing the small subset of images; and
h) otherwise, modifying the threshold viewing distance and repeating above steps c) through h).

14. The method according to claim 13, wherein modifying the threshold viewing distance of step h) after a first compression pass through the small subset of images further comprises using the average compressed data rate and the threshold viewing distance to determine an estimated slope for a rate-distortion function and using the estimated slope to compute a modified threshold viewing distance that will achieve the desired average compressed data rate.

15. The method according to claim 14, wherein modifying the threshold viewing distance of step h) after a second compression pass through the small subset of images further comprises using the average compressed data rate and the threshold viewing distance from the first compression pass and the average compressed data rate and the threshold viewing distance from the second compression pass to determine a calculated slope for a rate-distortion function and using the calculated slope to compute a modified threshold viewing distance that will achieve the desired average compressed data rate.

16. The method according to claim 15, wherein modifying the threshold viewing distance of step h) after at least a third compression pass through the subset of images further comprises using the average compressed data rate and the threshold viewing distance from the previous compression pass and the average compressed data rate and the threshold viewing distance from the current compression pass to determine a calculated slope for a rate-distortion function and using the calculated slope to compute a modified threshold viewing distance that will achieve the desired average compressed data rate.

17. The method claimed in claim 13, wherein the threshold viewing distance is input into a contrast sensitivity function calculator for computing the compression parameters.

* * * * *

UNITED STATES PATENT AND TRADEMARK OFFICE
CERTIFICATE OF CORRECTION

PATENT NO. : 7,813,564 B2  Page 1 of 1
APPLICATION NO. : 11/693958
DATED : October 12, 2010
INVENTOR(S) : Paul W. Jones It is certified that error appears in the above-identified patent and that said Letters Patent is hereby corrected as shown below:

| Column | Line | |
|---|---|---|
| 20 | 60 | In Claim 2, delete "estimates," and insert --estimated--. |
| 22 | 2 | In Claim 13, delete "image;" and insert --images;--. |

Signed and Sealed this
Twenty-second Day of February, 2011

David J. Kappos
*Director of the United States Patent and Trademark Office*